(12) United States Patent
Sohara

(10) Patent No.: US 11,866,599 B2
(45) Date of Patent: Jan. 9, 2024

(54) INK SET AND PRINTING METHOD

(71) Applicant: DAI NIPPON TORYO CO., LTD., Osaka (JP)

(72) Inventor: Yusuke Sohara, Tochigi (JP)

(73) Assignee: DAI NIPPON TORYO CO., LTD., Osaka (JP)

( * ) Notice: Subject to any disclaimer, the term of this patent is extended or adjusted under 35 U.S.C. 154(b) by 536 days.

(21) Appl. No.: 17/255,786

(22) PCT Filed: Jul. 18, 2019

(86) PCT No.: PCT/JP2019/028323
§ 371 (c)(1),
(2) Date: Dec. 23, 2020

(87) PCT Pub. No.: WO2020/017603
PCT Pub. Date: Jan. 23, 2020

(65) Prior Publication Data
US 2021/0147702 A1    May 20, 2021

(30) Foreign Application Priority Data

Jul. 20, 2018    (JP) .................................. 2018-136553

(51) Int. Cl.
*C09D 11/54*    (2014.01)
*B41M 5/00*    (2006.01)
(Continued)

(52) U.S. Cl.
CPC .............. *C09D 11/54* (2013.01); *B41J 2/2107* (2013.01); *B41M 5/0017* (2013.01);
(Continued)

(58) Field of Classification Search
CPC ... B41J 2/2117; B41J 2/01; B41J 2/211; B41J 2/1433; B41J 2/17; B41J 2/17593;
(Continued)

(56) References Cited

U.S. PATENT DOCUMENTS 5,198,023 A    3/1993 Stoffel
5,746,818 A *  5/1998 Yatake ................... C09D 11/30
                                                         106/31.89
(Continued)

FOREIGN PATENT DOCUMENTS

JP    6-57192    3/1994
JP    2002-211106    7/2002
(Continued)

OTHER PUBLICATIONS

ISR issued in WIPO Patent Application No. PCT/JP2019/028323, dated Sep. 24, 2019, English translation.
(Continued)

*Primary Examiner* — Manish S Shah
(74) *Attorney, Agent, or Firm* — GREENBLUM & BERNSTEIN, P.L.C.

(57) ABSTRACT

An ink set includes a water-based coloring ink and a water-based coating liquid having an acting of aggregating the water-based coloring ink, wherein a dynamic surface tension value at 25° C. at a surface life of 100 ms of the water-based coating liquid is smaller than a dynamic surface tension value at 25° C. at a surface life of 100 ms of the water-based coloring ink, a difference between the dynamic surface tension value at 25° C. at a surface life of 100 ms of the water-based coating liquid and the dynamic surface tension value at 25° C. at a surface life of 100 ms of the water-based coloring ink is 5 mN/m or more and 20 mN/m or less, and the dynamic surface tension value at 25° C. at a surface life of 100 ms of the water-based coating liquid is within a range of 20 to 30 mN/m.

15 Claims, 5 Drawing Sheets

(51) Int. Cl.
*B41M 7/00* (2006.01)
*C09D 11/102* (2014.01)
*C09D 11/322* (2014.01)
*C09D 11/40* (2014.01)
*B41J 2/21* (2006.01)

(52) U.S. Cl.
CPC .......... *B41M 5/0023* (2013.01); *B41M 7/009* (2013.01); *C09D 11/102* (2013.01); *C09D 11/322* (2013.01); *C09D 11/40* (2013.01); *B41M 5/007* (2013.01); *B41M 5/0047* (2013.01); *B41M 5/0058* (2013.01)

(58) Field of Classification Search
CPC ...... B41J 2/2107; B41J 2/1755; B41J 2/2114; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41M 5/0011; B41M 5/0017; B41M 5/0023; B41M 5/0047; B41M 7/00; B41M 7/0072; B41M 5/52; B41M 5/5218; B41M 5/5227; C09D 11/322; C09D 11/38; C09D 11/40; C09D 11/54; C09D 11/36; C09D 11/30; C09D 11/32; C09D 11/324; C09D 11/328; C09D 11/101; C09D 11/102; C09D 11/005; C09D 11/52; C09D 11/106; C09D 11/326; C09D 11/107; C09D 11/03; C09D 11/037; C09D 11/033

See application file for complete search history.

(56) References Cited

U.S. PATENT DOCUMENTS

| | | | | |
|---|---|---|---|---|
| 5,868,822 | A * | 2/1999 | Yui | C09D 11/106 347/100 |
| 8,236,096 | B2 | 8/2012 | Sakai | |
| 2004/0069183 | A1 * | 4/2004 | Kamoto | C09D 11/40 106/31.89 |
| 2006/0189714 | A1 * | 8/2006 | Kato | C09D 11/40 523/160 |
| 2006/0238590 | A1 * | 10/2006 | Koga | C09D 11/40 347/100 |
| 2007/0022902 | A1 * | 2/2007 | Koga | C09D 11/40 106/31.77 |
| 2007/0176995 | A1 * | 8/2007 | Kadomatsu | B41J 2/0057 347/103 |
| 2008/0207805 | A1 * | 8/2008 | Blease | C09D 11/40 524/556 |
| 2010/0236447 | A1 | 9/2010 | Sakai | |
| 2013/0155144 | A1 * | 6/2013 | Kunimine | H04N 1/58 347/20 |
| 2013/0258011 | A1 * | 10/2013 | Boris | C09D 11/38 524/561 |
| 2015/0251456 | A1 * | 9/2015 | Ueki | B41M 5/0023 347/102 |
| 2015/0267067 | A1 * | 9/2015 | Ueki | C09D 11/10 524/556 |
| 2016/0001579 | A1 * | 1/2016 | Hatanaka | C09D 11/30 347/20 |
| 2016/0023456 | A1 * | 1/2016 | Yoneyama | B41M 5/5281 347/20 |
| 2016/0082726 | A1 * | 3/2016 | Yoneyama | C09D 11/322 347/9 |
| 2019/0009602 | A1 * | 1/2019 | Torisaka | B41J 2/01 |

FOREIGN PATENT DOCUMENTS

| | | |
|---|---|---|
| JP | 2004-10833 | 1/2004 |
| JP | 2007-230232 | 9/2007 |
| JP | 2009-66768 | 4/2009 |
| JP | 2009-190379 | 8/2009 |
| JP | 2010-214883 | 9/2010 |
| JP | 2017-24365 | 2/2017 |
| JP | 2017-222793 | 12/2017 |
| JP | 2019-107875 | 7/2019 |

OTHER PUBLICATIONS

Written Opinion WIPO Patent Application No. PCT/JP2019/028323, dated Sep. 24, 2019, English translation.
IPRP issued in WIPO Patent Application No. PCT/JP2019/028323, dated Jan. 26, 2021, English translation.
EESR issued in EP Patent Application No. 19837471.2, Jun. 15, 2022.

* cited by examiner

[FIG. 1]
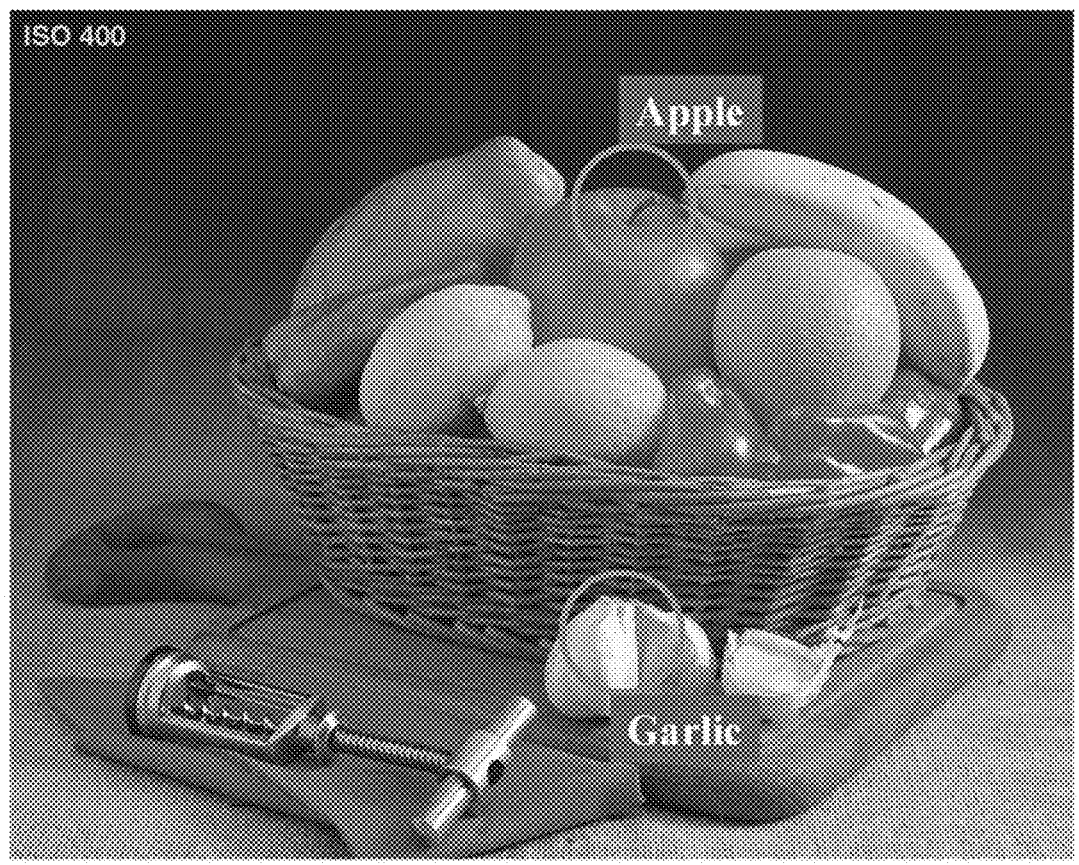

[FIG. 2]
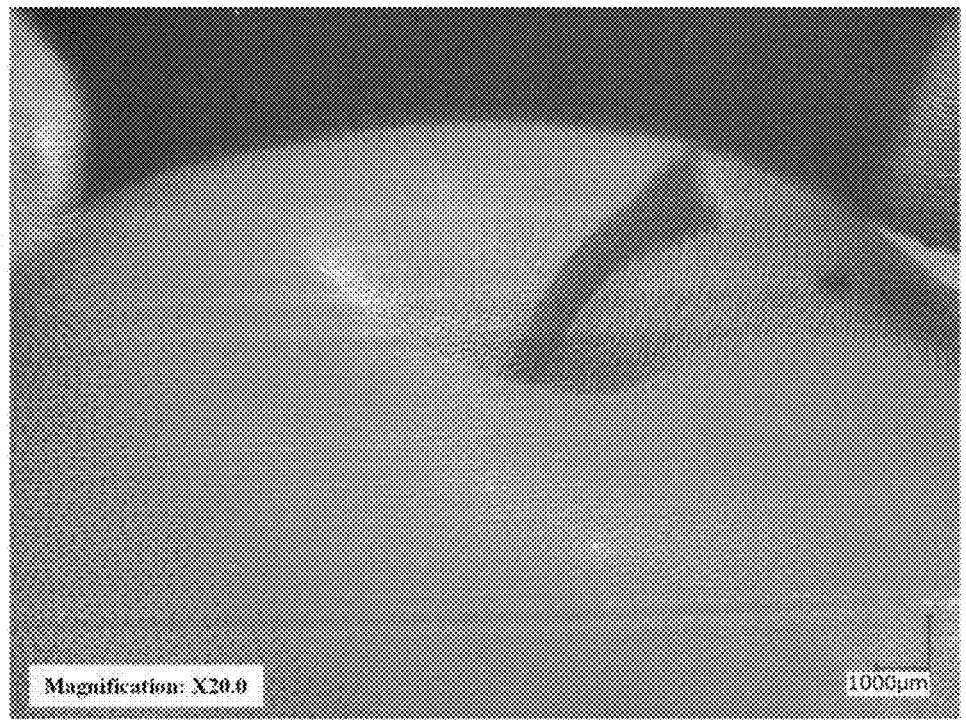
[FIG. 3]
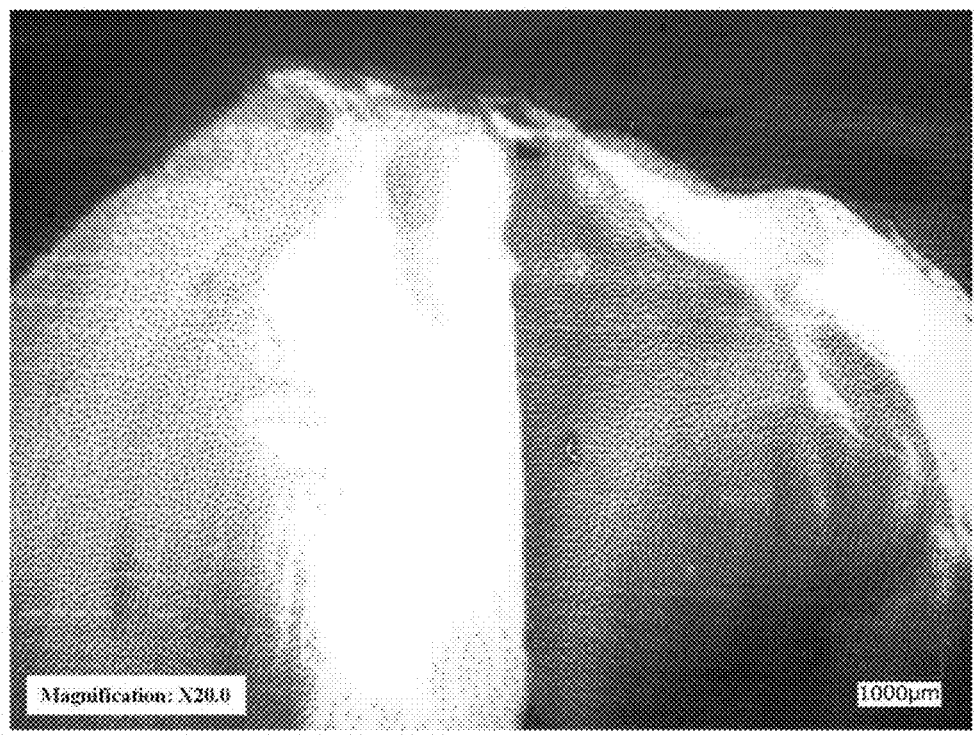

[FIG. 4]
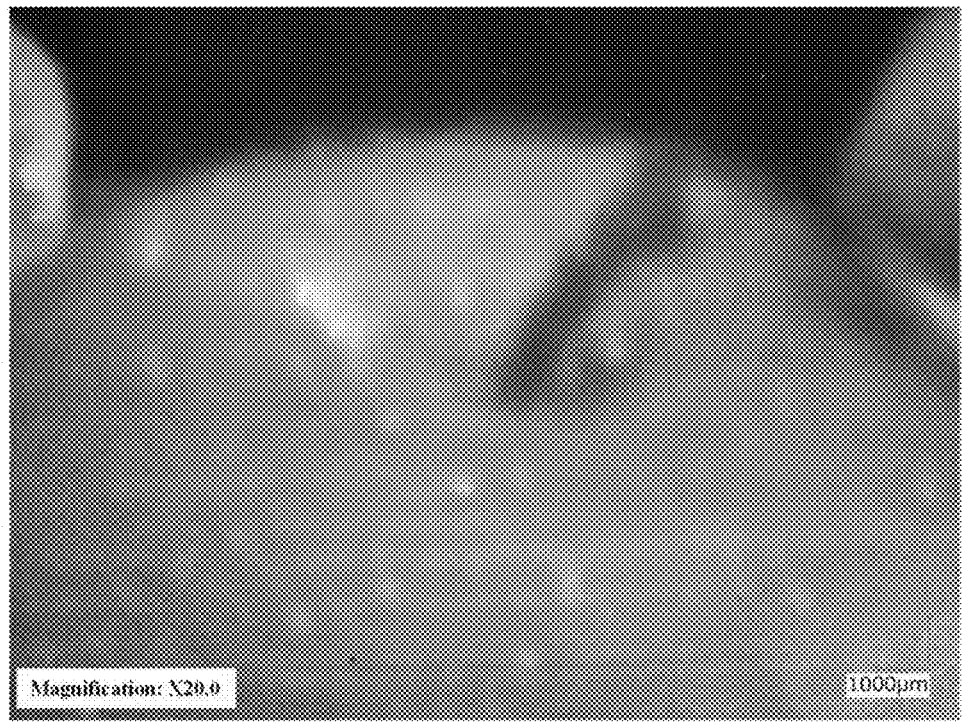
[FIG. 5]
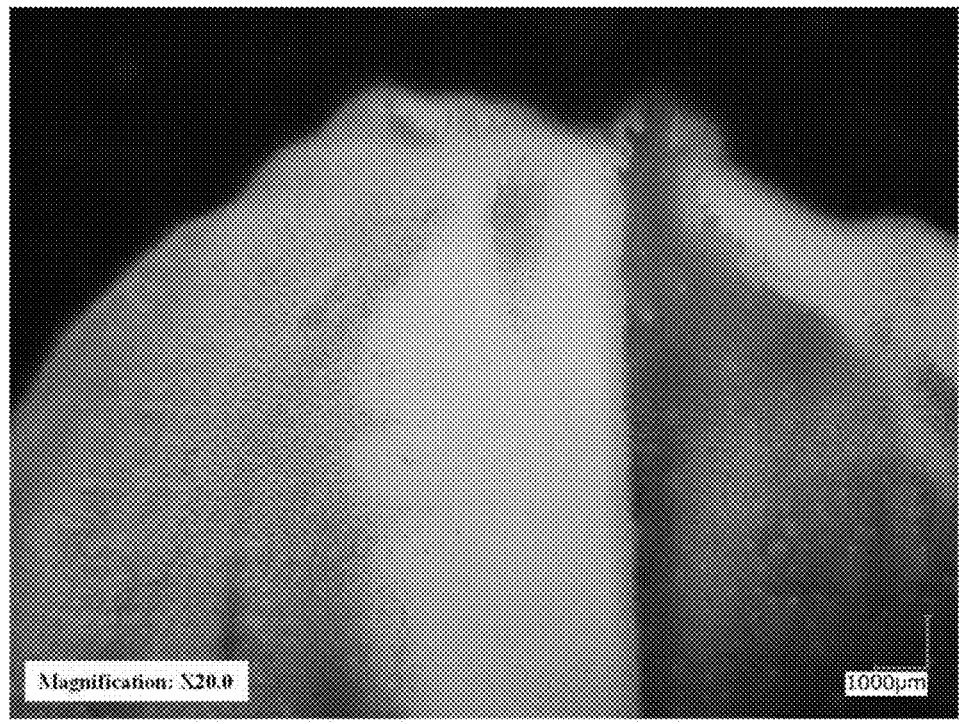

[FIG. 6]
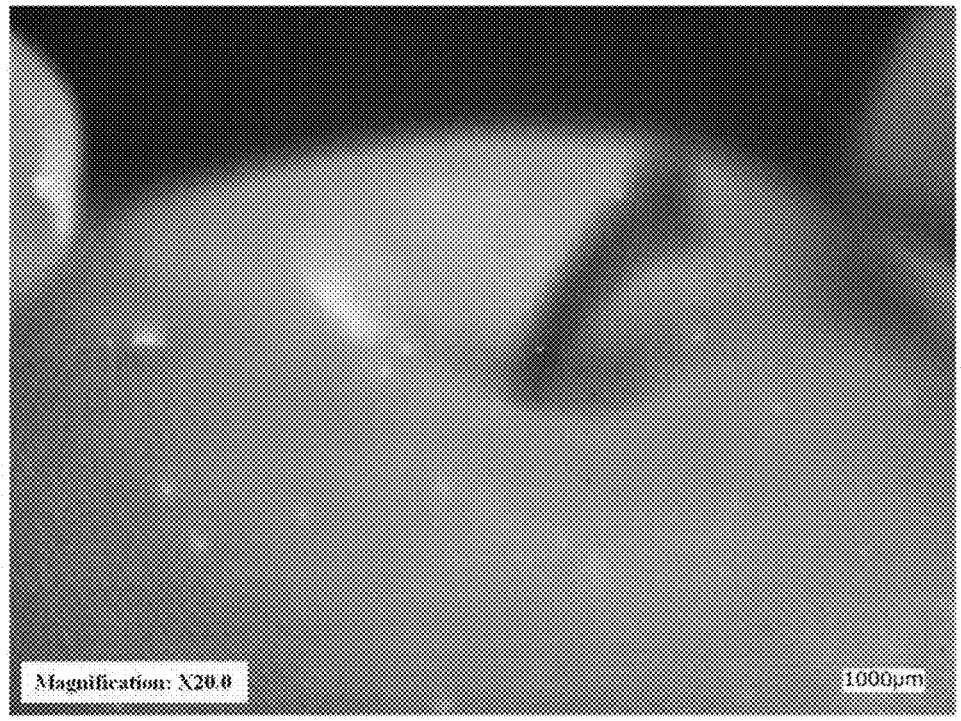
[FIG. 7]
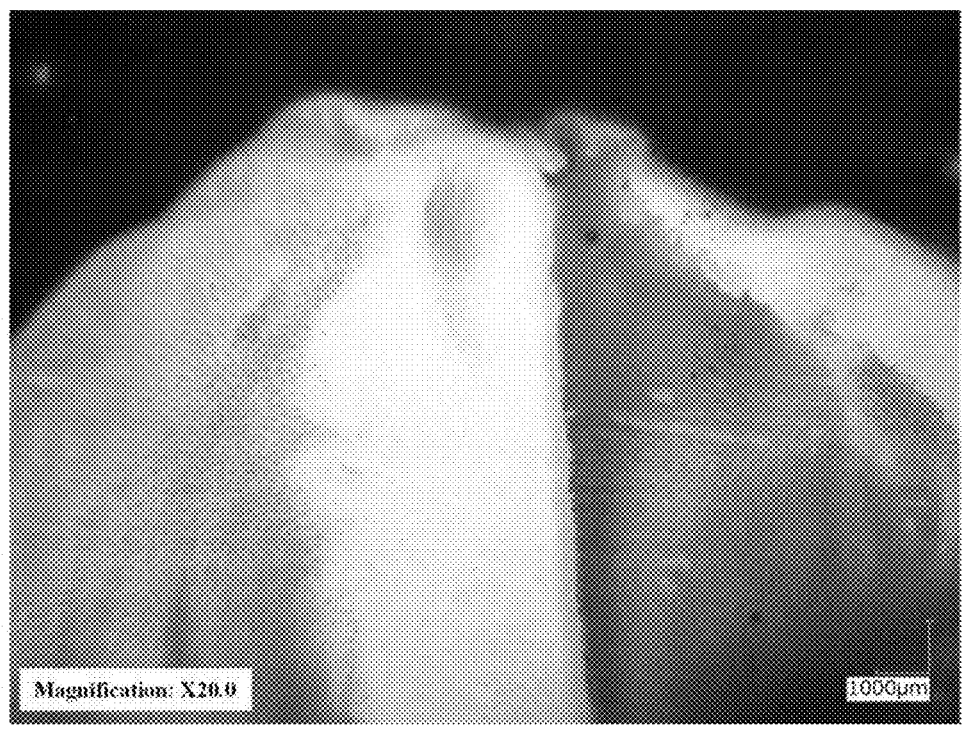

[FIG. 8]
[FIG. 9]
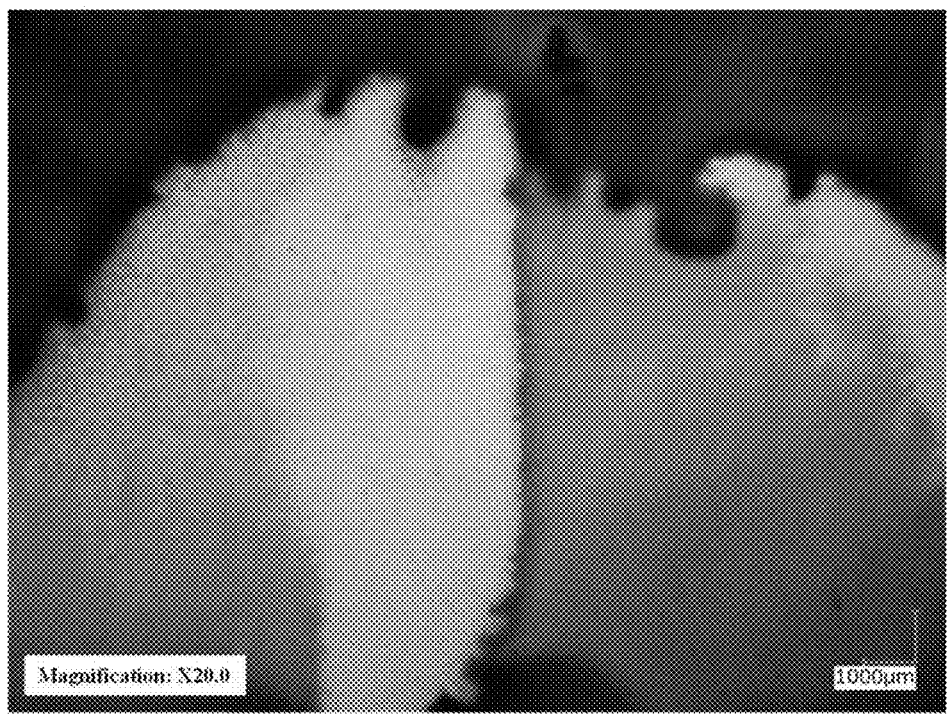

INK SET AND PRINTING METHOD

TECHNICAL FIELD

The present invention relates to an ink set and a printing method using the ink set, and more particularly to an ink set capable of suppressing the occurrence of expansion and shrink in the print layer and stably printing a high-definition image.

BACKGROUND ART

Various inks have been developed as inks used for printing by an inkjet printer, but water-based inks are widely used from the viewpoint of reducing the impact on the environment. However, since the water-based ink includes water as a solvent, it tends to cause bleeding during printing. As a method for improving the bleeding of the print layer formed by printing, for example, a method of using a treatment liquid having an acting of aggregating coloring inks is known (for example, JP H6-57192 A and JP 2009-190379 A). A water-based ink set that combines such a treatment liquid and a coloring ink is also referred to as a two-component reacting type water-based ink set.

In addition, JP 2017-222793 A describes an ink set comprising a water-based coloring ink and a water-based coating liquid characterizing in that the water-based coloring ink comprises water, a self-dispersible pigment, a water-soluble solvent and a resin, the water-based coating liquid comprises water, a water-soluble solvent and a resin, the resin included in the water-based coating liquid comprises a water-soluble polymer having a quaternary ammonium cation, and pH of the water-based coating liquid ranges from 7.1 to 10.0.

CITATION LIST

Patent Literature

Patent Literature 1: JP H6-57192 A
Patent Literature 2: JP 2009-190379 A
Patent Literature 3: JP 2017-222793 A
Patent Literature 4: JP 2004-10833 A
Patent Literature 5: JP 2017-24365 A
Patent Literature 6: JP 2010-214883 A

SUMMARY OF INVENTION

Technical Problem

According to the ink set described in JP 2017-222793 A, it is possible to provide an ink set capable of suppressing the occurrence of bleeding of the print layer and the occurrence of corrosion of the printing equipment, and of forming the print layer having good fixability without lowering the gloss.

However, as a result of further studies by the present inventor, as described in JP 2017-222793 A, even when the fixability of the landed ink is improved by the aggregating acting on the coloring ink, and the dot shape of the ink is maintained at a portion where the printing density is relatively low, it is found that when the entire print layer is viewed as an image including a portion having a high printing density, the dot shape of the ink is not maintained and the print layer may expand or shrink, and there is still room for improvement in order to provide an ink set capable of stably printing high-definition images.

In the present specification, a phenomenon in which at least a part of the outline of an image is printed with expansion as compared with an image printed at a predetermined position is expressed as "expansion of a print layer". A phenomenon in which at least a part of the outline of an image is printed with shrinkage as compared with an image printed at a predetermined position is expressed as "shrinkage of a print layer". "Expansion of print layer" and "shrinkage of print layer" will be described below using an actual image.

FIG. 1 illustrates an ISO 400 N3A standard color image (fruit basket). FIG. 2 illustrates an example of a fine image in which the standard color image in FIG. 1 is not expanded or shrunk (the part corresponding to the apple in the round frame of FIG. 1 is magnified 20 times), and FIG. 3 illustrates an example of a fine image in which the standard color image in FIG. 1 is not expanded or shrunk (the part corresponding to the garlic in the round frame in FIG. 1 is magnified 20 times). FIG. 2 and FIG. 3 are enlarged views of a specific part extracted from the same image, and as can be seen from FIGS. 2 to 3, color boundaries and dots can be clearly confirmed. FIG. 4 illustrates an example of an image in which the standard color image of FIG. 1 is shrunk (the part corresponding to the apple in the round frame of FIG. 1 is magnified 20 times), and FIG. 5 illustrates an example of an image in which the standard color image of FIG. 1 is shrunk (the part corresponding to the garlic in the round frame in FIG. 1 is magnified 20 times). In FIG. 4 and FIG. 5, a specific part is extracted from the same image and enlarged, but in FIG. 4 and FIG. 5, the print layer is shrunk and the fineness of the image is reduced. FIG. 6 illustrates an example of an image in which the standard color image of FIG. 1 is expanded (the part corresponding to the apple in the round frame of FIG. 1 is magnified 20 times), and FIG. 7 illustrates an example of an image in which the standard color image of FIG. 1 is expanded (the part corresponding to the garlic in the round frame in FIG. 1 is magnified 20 times). FIG. 6 and FIG. 7 are enlarged views of a specific portion extracted from the same image, but in FIG. 6 and FIG. 7, the print layer is expanded and the fineness of the image is reduced. FIG. 8 illustrates an example of another image in which the standard color image of FIG. 1 is expanded (the part corresponding to the apple in the round frame of FIG. 1 is magnified 20 times), and FIG. 9 illustrates an example of another image in which the standard color image in FIG. 1 is expanded (the part corresponding to the garlic in the round frame in FIG. 1 is magnified 20 times). FIG. 8 and FIG. 9 are enlarged views of a specific part extracted from the same image, but the print layer expands significantly as compared with FIG. 6 and FIG. 7, and the original shape of the image is not retained.

Therefore, an object of the present invention is to solve the above-mentioned problems of the prior art and to provide an ink set capable of suppressing the occurrence of expansion and shrinkage of the print layer and stably printing a high-definition image. In addition, another object of the present invention is to provide a printing method using such an ink set.

Solution to Problem

In the conventional two-component reacting type water-based ink set, a method of controlling the surface tension of the ink or the treatment liquid for the purpose of suppressing the occurrence of bleeding and beading in the print layer has been known (for example, JP 2004-10833 A, JP 2017-24365 A and JP 2010-214883 A), even with such a technique, it has been difficult to suppress the occurrence of expansion and shrinkage of the print layer and stably print a high-definition image.

Under such circumstances, the present inventor considered that the properties of the water-based coating liquid and the water-based coloring ink at the time of landing were important, and when the dynamic surface tension was focused and examined, it has been found that by setting the dynamic surface tension value of the water-based coloring ink to be higher than the dynamic surface tension value of the water-based coating liquid within a specific range while the dynamic surface tension value of the water-based coating liquid is set to be low, the occurrence of expansion and shrinkage in the print layer can be suppressed and high-definition images can be printed stably, and as a result, the present invention has been accomplished.

That is, the ink set of the present invention is an ink set, comprising a water-based coloring ink and a water-based coating liquid having an acting of aggregating the water-based coloring ink, wherein a dynamic surface tension value at 25° C. at a surface life of 100 ms of the water-based coating liquid is smaller than a dynamic surface tension value at 25° C. at a surface life of 100 ms of the water-based coloring ink, a difference between the dynamic surface tension value at 25° C. at a surface life of 100 ms of the water-based coating liquid and the dynamic surface tension value at 25° C. at a surface life of 100 ms of the water-based coloring ink is 5 mN/m or more and 20 mN/m or less, and the dynamic surface tension value at 25° C. at a surface life of 100 ms of the water-based coating liquid is within a range of 20 to 30 mN/m.

In a preferred embodiment of the ink set of the present invention, the water-based coating liquid comprises water in a range of 50% by mass to 90% by mass, an organic solvent in a range of 5% by mass to 35% by mass, and a resin in a range of 0.005% by mass to 5% by mass.

In another preferred embodiment of the ink set of the present invention, the water-based coloring ink comprises polyether urethane resin particles and/or polyester urethane resin particles.

In addition, the printing method of the present invention is a printing method in which a print layer is formed on a substrate by an inkjet printer provided with the ink set described above, comprising: ejecting the water-based coating liquid from a print head to land coating droplets on the substrate; and ejecting the water-based coloring ink from a print head to land ink droplets on the coating liquid to form the print layer.

A preferred embodiment of the printing method of the present invention further comprises drying the print layer with hot air.

In another preferred embodiment of the printing method of the present invention, the substrate is a non-absorbent substrate or a poorly absorbable substrate.

In another preferred example of the printing method of the present invention, the water-based coloring ink is composed of a plurality of water-based coloring inks, and the water-based coloring ink that first lands on the coating liquid has a lowest dynamic surface tension at 25° C. at a surface life of 100 ms among the plurality of water-based coloring inks.

Advantageous Effects of Invention

According to the ink set of the present invention, it is possible to provide an ink set capable of suppressing the occurrence of expansion and shrink in the print layer and stably printing a high-definition image. In addition, according to the printing method of the present invention, it is possible to provide a printing method using such an ink set.

BRIEF DESCRIPTION OF DRAWINGS

FIG. 1 illustrates an ISO 400 N3A standard color image (fruit basket).

FIG. 2 illustrates an example of a fine image in which the standard color image in FIG. 1 is not expanded or shrunk (the part corresponding to the apple in the round frame in FIG. 1 is magnified 20 times).

FIG. 3 illustrates an example of a fine image in which the standard color image in FIG. 1 is not expanded or shrunk (the part corresponding to the garlic in the round frame in FIG. 1 is magnified 20 times).

FIG. 4 illustrates an example of an image in which the standard color image in FIG. 1 is shrunk (the part corresponding to the apple in the round frame in FIG. 1 is magnified 20 times).

FIG. 5 illustrates an example of an image in which the standard color image in FIG. 1 is shrunk (the part of the round frame in FIG. 1 corresponding to garlic is magnified 20 times).

FIG. 6 illustrates an example of an image in which the standard color image of FIG. 1 is expanded (the part corresponding to the apple in the round frame of FIG. 1 is magnified 20 times).

FIG. 7 illustrates an example of an image in which the standard color image in FIG. 1 is expanded (the part corresponding to the garlic in the round frame in FIG. 1 is magnified 20 times).

FIG. 8 illustrates an example of another image in which the standard color image of FIG. 1 is expanded (the part corresponding to the apple in the round frame of FIG. 1 is magnified 20 times).

FIG. 9 illustrates an example of another image in which the standard color image in FIG. 1 is expanded (the part corresponding to the garlic in the round frame in FIG. 1 is magnified 20 times).

DESCRIPTION OF EMBODIMENTS

The ink set of the present invention will be described in detail below. The ink set of the present invention is an ink set, comprising a water-based coloring ink and a water-based coating liquid having an acting of aggregating the water-based coloring ink, wherein a dynamic surface tension value at 25° C. at a surface life of 100 ms of the water-based coating liquid is smaller than a dynamic surface tension value at 25° C. at a surface life of 100 ms of the water-based coloring ink, a difference between the dynamic surface tension value at 25° C. at a surface life of 100 ms of the water-based coating liquid and the dynamic surface tension value at 25° C. at a surface life of 100 ms of the water-based coloring ink is 5 mN/m or more and 20 mN/m or less, and the dynamic surface tension value at 25° C. at a surface life of 100 ms of the water-based coating liquid is within a range of 20 to 30 mN/m.

In the ink set of the present invention, the water-based coloring ink is usually an ink comprising water, a pigment, an organic solvent and a resin, and is preferably an inkjet ink. Note that the inkjet ink is an ink composition for an inkjet printer. In addition, in the ink set of the present invention, the water-based coating liquid is a liquid for coating a substrate and aggregating coloring inks, and usually comprises water, an organic solvent and a resin. It is preferably a coating liquid that can be used in an inkjet printer.

In the present specification, a composition comprising a colorant in an amount of more than 0.1% by mass is expressed as an "ink", and a composition comprising no colorant or comprising 0.1% by mass or less of a colorant is simply expressed as a "liquid". In addition, in the present specification, the "water-based ink" is an ink containing water as a main solvent, and the "water-based coating liquid" is a coating liquid containing water as a main solvent.

In the ink set of the present invention, the water-based coloring ink may consist of a plurality of water-based coloring inks that emit different colors, and can exemplify a water-based coloring ink comprising at least four types of inks: cyan ink, magenta ink, yellow ink, and black ink.

In the ink set of the present invention, the water-based coating liquid has a dynamic surface tension value at 25° C. at a surface life of 100 ms in the range of 20 to 30 mN/m. The dynamic surface tension value described above is adjusted to a relatively low range of 20 to 30 mN/m in order to fully exert the aggregating effect expected of the coating liquid. If the dynamic surface tension value is within the range specified above, the wettability at the time of landing on the substrate is high, so that it can expand over the entire surface of the substrate. In addition, such a coating liquid has an aggregating acting of coloring ink, but also has a high wettability, so that it is possible to effectively suppress the occurrence of expansion and shrinkage of the print layer. If the dynamic surface tension value of the water-based coating liquid is less than 20 mN/m, the surface tension force is superior to the aggregating effect of the water-based coating liquid, so that the water-based coloring ink to be printed later deviates larger from the landing position, resulting in the occurrence of a shrinkage phenomenon. In the ink set of the present invention, the dynamic surface tension value at 25° C. at a surface life of 100 ms of the water-based coating liquid is preferably in the range of 25 to 30 mN/m.

In the ink set of the present invention, the dynamic surface tension value at 25° C. at a surface life of 100 ms of the water-based coating liquid is smaller than the dynamic surface tension value at 25° C. at the surface life of 100 ms of the water-based coloring ink, and the difference between the dynamic surface tension value at 25° C. at a surface life of 100 ms for a water-based coating liquid and the dynamic surface tension value at 25° C. at a surface life of 100 ms for a water-based coloring ink is 5 mN/m or more and 20 mN/m or less. The water-based coloring ink is premised on preventing bleeding, but since it is desirable to land on a surface having a high wettability, the dynamic surface tension value of the water-based coating liquid is smaller than the dynamic surface tension value of the water-based coloring ink. Here, if the difference in the dynamic surface tension value between the water-based coating liquid and the water-based coloring ink was too large, the print layer would shrink. According to the present invention, by setting the difference between the dynamic surface tension value at 25° C. at a surface life of 100 ms for a water-based coating liquid and the dynamic surface tension value at 25° C. at a surface life of 100 ms for a water-based coloring ink to be 20 mN/m or less, preferably 13 mN/m or less, it is possible to prevent the occurrence of shrinkage of the print layer. On the other hand, if the difference in the dynamic surface tension value between the water-based coating liquid and the water-based coloring ink was too small, or if the dynamic surface tension value of the water-based coating liquid was larger than the dynamic surface tension value of the water-based coloring ink, the print layer would expand. According to the present invention, by setting the difference between the dynamic surface tension value at 25° C. at a surface life of 100 ms for a water-based coating liquid and the dynamic surface tension value at 25° C. at a surface life of 100 ms for a water-based coloring ink to be 5 mN/m or more, preferably 7 mN/m or more, it is possible to prevent the expansion of the print layer. By controlling the dynamic surface tension value between the water-based coating liquid and the water-based coloring ink in this way, it is possible to stably print a high-definition image.

In the ink set of the present invention, the water-based coloring ink preferably has a dynamic surface tension value in the range of 25 to 50 mN/m at 25° C. at a surface life of 100 ms, and more preferably in the range of 30 to 40 mN/m.

"Dynamic surface tension" refers to the surface tension that moves toward an equilibrium state over time, and it can be measured using a dynamic surface tension meter (for example, BP2 manufactured by KRUSS) and the maximum bubble pressure method. In the present specification, the surface tension at a surface life of 100 ms is measured for an ink or coating liquid at 25° C.

In the maximum bubble pressure method, air is passed through a probe (tube) inserted in a liquid, and the surface tension is calculated by measuring the maximum pressure (maximum bubble pressure) when bubbles are generated. By continuously ejecting bubbles from the tip of the probe in the liquid, the pressure in the probe changes periodically, and the pressure becomes maximum when the radius of curvature of the bubbles and the radius of the tip of the probe become equal. The time when a new interface is formed in the probe is 0 ms, and the time until the maximum foam pressure is reached is the surface life. Then, the surface tension at each surface life can be obtained from the maximum pressure (maximum foam pressure) here.

The reason why the surface life is set to 100 ms is that it is considered to be the most suitable timing for controlling the behavior from the impact of the ink to the wet expansion of the ink. In high-speed printing with an inkjet printer, it takes about 10 to 100 ms from the landing of one dot to the completion of wet expansion, and the expanding behavior itself immediately after landing is developed on a very short time scale. Since 100 ms is the timing when the ink that has landed on the substrate has just wetted and expanded, it is considered that the immobilization of the ink due to the contact between the water-based coating liquid and the water-based coloring ink can be performed in the most suitable state by controlling the dynamic surface tension value at this time to an appropriate value.

By controlling the static surface tension value in addition to controlling the dynamic surface tension value as described above for the same reason, it is possible to more effectively suppress the expansion and shrinkage of the print layer, and this is preferable from the viewpoint of stable printing of high-definition images. The "static surface tension value" refers to a surface tension value that has reached an equilibrium state, and is measured in the present specification based on the plate method.

In the ink set of the present invention, the water-based coating liquid preferably has a static surface tension value at 25° C. in the range of 20 to 25 mN/m, and more preferably in the range of 20 to 23 mN/m. On the other hand, the water-based coloring ink preferably has a static surface tension value at 25° C. in the range of 20 to 50 mN/m, and more preferably in the range of 23 to 38 mN/m. In addition, in the ink set of the present invention, the static surface tension value of the water-based coating liquid at 25° C. is preferably smaller than the static surface tension value of the water-based coloring ink at 25° C. The difference is preferably 3 mN/m or more and 15 mN/m or less, and more preferably 4 mN/m or more and 10 mN/m or less.

The coloring ink and the coating liquid used in the ink set of the present invention are all water-based, and the surface tension values of the water-based coloring ink and the water-based coating liquid generally tend to be high. Therefore, it is important that the surface tension value is adjusted by appropriately adjusting the type and content of the organic solvent and/or the type and content of the additive including the surface conditioner (preferably a polyether-modified silicone-based surface conditioner). In particular, the diol compound and the glycol ether compound described later are highly effective in reducing the dynamic surface tension and are effective in adjusting the dynamic surface tension value.

In the ink set of the present invention, the water-based coloring ink and the water-based coating liquid comprise water, which preferably includes pure water such as ion-exchanged water and distilled water, ultrapure water and the like. In addition, when the ink or coating liquid is stored for a long period of time, water sterilized by ultraviolet irradiation or the like may be used in order to prevent the growth of mold and bacteria. It can be exemplified that the water content in the water-based coloring ink and the water-based coating liquid described above is within the range of 20 to 90% by mass, but preferably 50 to 90% by mass, and more preferably 60 to 80% by mass. With this, it is possible to provide a water-based coloring ink and a water-based coating liquid having less impact on the environment.

In the ink set of the present invention, the water-based coating liquid usually comprises a resin, and the resin preferably comprises a water-soluble polymer having a cation. Since the water-soluble polymer has a cation, it can exhibit the ability to aggregate coloring inks. With this, the adhesion of the print layer to the substrate can be improved while suppressing the occurrence of bleeding of the print layer, and high-speed printing becomes possible. In addition, if it is a cation, it can exhibit the ability to aggregate coloring ink even if it is present in a water-based coating liquid having a pH in the basic region. However, since the water-soluble polymer described above may have a high ability to aggregate coloring inks, cause aggregation of coloring inks to occur remarkably quickly, and reduce the gloss of the print layer, it is preferably combined with a self-dispersible pigment described later. In addition, the water-based coating liquid prepared by using the water-soluble polymer having a cation keeps its viscosity and pH even after long-term storage, and excellent storage stability can be obtained.

In the present invention, the water-soluble polymer means a polymer that dissolves in water or an aqueous solution comprising less than 50% by mass of a water-soluble organic solvent.

The water-soluble polymer having the cation is preferably a water-soluble polymer having a quaternary ammonium cation (cationized nitrogen atom). By using a water-soluble polymer having a quaternary ammonium cation, the occurrence of bleeding of the print layer is further suppressed, and the scratch resistance of the print layer and the storage stability of the water-based coating liquid are improved.

The water-soluble polymer having a cation preferably has a weight average molecular weight of 1,000 to 50,000, more preferably 2,500 to 45,000, and even more preferably 5,000 to 40,000. By setting the weight average molecular weight of the water-soluble polymer described above to 1,000 or more, the water-soluble polymer having a cation has a high ability to aggregate the coloring ink, and the effect of suppressing bleeding of the print layer and the effect of improving the adhesiveness can be improved. On the other hand, if the weight average molecular weight exceeds 50,000, the ejection stability may be lowered.

In the present specification, the weight average molecular weight is a value measured by gel permeation chromatography (GPC), polystyrene is used as a standard substance, and tetrahydrofuran is used as a mobile phase.

The water-soluble polymer having a cation preferably has a cation in the main chain. When a water-soluble polymer having such a structure is used, when the water-based coloring ink lands on the water-based coating liquid, only the interface of the water-based coloring ink instantly aggregates, and the water-based coloring inks is fixed at the position where the water-based coloring ink lands without mixing with each other, so that it is more preferable in the case of high-speed printing.

The water-soluble polymer having a cation is preferably two or more kinds of water-soluble polymers having different cation degrees. By using a plurality of water-soluble polymers having different cation degrees, it becomes easy to adjust the size of the dot diameter and the bleeding.

Specifically, the water-soluble polymers having a cations preferably comprises a water-soluble polymer having a cation degree of 5.5 to 7.5 meq/g at pH 7.1 and a water-soluble polymer having a cation degree of 2.0 to 5.0 meq/g at pH 7.1, and more preferably comprises a water-soluble polymer having a cation degree of 6.0 to 7.0 meq/g at pH 7.1 and a water-soluble polymer having a cation degree of 2.5 to 4.5 meq/g at pH 7.1. The ratio of the water-soluble polymer having the two types of cation degree ranges described above is such that the mass ratio of the water-soluble polymer having a high cation degree range to the water-soluble polymer having a low cation degree range is preferably 1:1 to 20:1, more preferably in the range of 7:3 to 10:1.

Note that the degree of cation can be determined by colloidal titration using a polyvinyl potassium sulfate reagent in this specification. The detailed procedure is as follows.

90 mL of deionized water is taken in a conical beaker, 10 mL of a 500 ppm aqueous solution of the sample (dry product equivalent) is added, pH is set to 7.1 with an aqueous amine solution, and it is stirred for about 1 minute. Next, 2-3 drops of toluidine blue indicator are added and it is titrated with N/400 polyvinyl sulfate potassium reagent (N/400PVSK). The titration rate is 2 mL/min, and the end point is when the color of the test water changes from blue to purplish red and is held for 10 seconds or longer. The formula for calculating the cation degree (meq/g) is as follows.

Cation degree=(N/400PVSK titration amount)×(N/400PVSK titer)/2

A commercially available product can be used as the water-soluble polymer having a cation. Above all, a water-soluble polymer having quaternary ammonium cation is preferable, and from the viewpoint that it can exist stably even if it is basic, for example, epichlorohydrin and alkylamine reacting products, which are commercially available under the names of DK6810, DK6851, DK6864, WS4030, WS4027, WS4052, CA6018 (all manufactured by Seikou PMC Corporation), Harsize CP-300, CP-800 (all manufactured by Harima Chemicals Group Inc.), PAS-H-1L, PAS-H-5L, PAS-2401, PAS-A-1 (all manufactured by Nittobo Medical Co., Ltd.), Kachio Master PDT-2, PD-7, PD-30 (all manufactured by Yokkaichi Chemical Co., Ltd.), polyamine resins, polyamide-epichlorohydrin resins and the like are included. The water-soluble polymer having a cation may be used alone or in combination of two or more.

The proportion of the water-soluble polymer having a cation in the resin included in the water-based coating liquid is preferably 50% by mass or more, and in particular, from the viewpoint of appropriately controlling the aggregating acting, the proportion of the water-soluble polymer having a quaternary ammonium cation in the resin included in the water-based coating liquid is preferably 50% by mass or more.

As the other resin that can be used in the water-based coating liquid, a resin that is usually used in the ink industry other than the water-soluble polymer having a cation described above can be used. Examples thereof include acrylic resin, silicone resin, acrylic silicone resin, styrene acrylic copolymer resin, polyester resin, rosin resin, phenol resin, urethane resin, melamine resin, urea resin, epoxy resin, cellulose resin, butyral resin, maleic acid resin, fumaric acid resin, vinyl resin and the like. These resins may be used alone, or in combination of two or more. In the present specification, the "resin" is a resin mainly classified as a binder, and a polymer classified as a thickener described later is excluded.

It can be exemplified that the content of the resin in the water-based coating liquid is 0.005 to 15% by mass, but it is preferably 0.005 to 10% by mass, more preferably 0.005 to 5% by mass, even more preferably 0.005 to 3% by mass, and especially preferably 0.005 to 2% by mass.

In addition, the resin that can be used for the water-based coloring ink is not particularly limited, and resins that are normally used in the ink industry can be used. Examples thereof include acrylic resin, silicone resin, acrylic silicone resin, styrene acrylic copolymer resin, polyester resin, rosin resin, petroleum resin, kumaron resin, phenol resin, urethane resin, melamine resin, urea resin, epoxy resin, cellulose resin, xylene resin, alkyd resin, aliphatic hydrocarbon resin, butyral resin, maleic acid resin, fumaric acid resin, vinyl resin and the like. These resins may be used alone, or in combination of two or more.

The resin that can be used for the water-based coloring ink can include a self-dispersible resin. The self-dispersible resin is a resin that can maintain a dispersed state in an ink without using a surfactant or an emulsifier, and a polymer having a hydrophilic group such as sulfonic acid or a salt thereof or carboxylic acid or a salt thereof in the end or a side chain, a polymer having a hydrophilic group such as a polycarbonate group, a polyester group, or a polyether group in the main chain, or the like is usually preferably used. The hydrophilic groups of the self-dispersible resin repel each other with the hydrophilic groups of the self-dispersible pigment described later, so that the dispersed state is maintained, and as a result, an ink having excellent storage stability can be prepared. These self-dispersible resins may be used alone, or in combination of two or more. A commercially available product may be used as the self-dispersible resin.

The self-dispersible resin preferably includes a self-dispersible urethane resin from the viewpoint of improving the performance of the print layer such as scratch resistance and water resistance, and further from the viewpoint of imparting high adhesion to various substrates, it is more preferable to include a polyester group- or a polyether group-containing self-dispersible urethane resin. The ratio of the self-dispersible urethane resin in the self-dispersible resin is preferably 30 to 100% by mass.

The self-dispersible urethane resin preferably has a weight average molecular weight of 100,000 to 1,000,000, more preferably 150,000 to 750,000, and even more preferably 200,000 to 500,000. When the weight average molecular weight of the self-dispersible urethane resin is within the specified range described above, the scratch resistance can be further improved and a strong print layer can be formed.

In the present specification, the weight average molecular weight is a value measured by gel permeation chromatography (GPC), polystyrene is used as a standard substance, and tetrahydrofuran is used as a mobile phase.

The self-dispersible urethane resin can be obtained by reacting a polyol component such as a polyester polyol, a polyether polyol, or a polycarbonate polyol with a polyisocyanate component, and optionally with a chain extender.

The polyester polyol is not particularly limited, and examples thereof include polyethylene adipate, polyethylene propylene adipate, polybutylene adipate, polyhexamethylene adipate, polydiethylene adipate, polyethylene terephthalate, polyethylene isophthalate, polyhexamethylene isophthalate, polyethylene succinate, polybutylene succinate, polyethylene sebacate, polybutylene sebacate, poly-ε-caprolactamdiol, poly (3-methyl-1,5-pentylene adipate) and the like. By using a polyester polyol as the polyol component, a polyester group-containing self-dispersible urethane resin can be obtained. Since such a resin is dispersed in the coloring ink in the form of particles, it is also referred to as polyester urethane resin particles in the present specification.

The polyether polyol is not particularly limited, and examples thereof include polyoxytetramethylene glycol, polyoxypropylene glycol, polyoxyethylene glycol, polyoxyethylene-propylene glycol and the like. By using a polyether polyol as the polyol component, a polyether group-containing self-dispersible urethane resin can be obtained. Since such a resin is dispersed in the coloring ink in the form of particles, it is also referred to as polyether urethane resin particles in the present specification.

The polycarbonate polyol is not particularly limited, and examples thereof include 1,6-hexanediol polycarbonate polyol, 1,4-butanediol polycarbonate polyol, poly-1,4-cyclohexanedimethylene carbonate diol and the like. By using a polycarbonate polyol as the polyol component, a polycarbonate group-containing self-dispersible urethane resin can be obtained. Since such a resin is dispersed in the coloring ink in the form of particles, it is also referred to as polycarbonate urethane resin particles in the present specification.

An acrylic polyol or the like may be used as the polyol component.

These polyol components may be used alone, or in combination of two or more.

Examples of the polyisocyanate component include polyisocyanate compounds such as tolylene diisocyanate, xylene diisocyanate, diphenylmethane diisocyanate, naphthylene diisocyanate, 1,3-bis (isocyanatomethyl) cyclohexane, tetramethylxylene diisocyanate, hexamethylene diisocyanate, isophorone diisocyanate, dicyclohexylmethane diisocyanate and norbornane diisocyanate. Among these polyisocyanate components, xylene diisocyanate, 1,3-bis (isocyanatomethyl) cyclohexane, hexamethylene diisocyanate, isophorone diisocyanate, 4,4'-methylenebis (cyclohexyl isocyanate) or norbornane diisocyanate is preferable. These polyisocyanate components may be used alone, or in combination of two or more.

Examples of the chain extender include low molecular weight polyhydric alcohols and low molecular weight polyamines. Examples of low molecular weight polyhydric alcohols include ethylene glycol, diethylene glycol, 1,4-butanediol, 1,6-hexanediol, 3-methyl-1,5-pentanediol, neopentyl glycol, trimethylolpropane, pentaerythritol, 1,4-cyclohexanedimethanol, dimethylolalkanoic acids such as dimethylolbutanoic acid and dimethylolpropionic acid and the like. Examples of low molecular weight polyamines include ethylenediamine, trimethylenediamine, tetramethylenediamine, hexamethylenediamine, hydrazine, piperazine, isophoronediamine, norbornandiamine, diaminodiphenylmethane, diaminocyclohexylmethane, tolylenediamine, xylenediamine, diethylenetriamine, triethylenetetramine, tetraethylenepentamine, iminobispropylamine and the like. These chain extenders may be used alone, or in combination of two or more.

In the ink set of the present invention, the water-based coloring ink preferably comprises polyether urethane resin particles and/or polyester urethane resin particles. Such a water-based coloring ink has good storage stability, and after drying, it is possible to form a strong film having excellent adhesion to a wide range of substrates including non-absorbent substrates and poorly absorbable substrates.

The self-dispersible resin is dispersed in the ink and is in the form of particles. Here, the self-dispersible resin preferably has a 50 volume % particle diameter (D50) of 10 nm to 90 nm, more preferably 20 nm to 70 nm, and even more preferably 30 nm to 60 nm. If the 50 volume % particle diameter is within the specified range described above, an ink having a good dispersion state of the self-dispersible resin and excellent storage stability can be prepared. In the present invention, the 50 volume % particle diameter (D50) refers to the 50% particle diameter ($D_{50}$) of the volume reference particle size distribution, and can be obtained from the particle size distribution measured by using a laser diffracting/scattering type particle size distribution measuring device (for example, SALD-7000: manufactured by Shimadzu Corporation). Then, the particle diameter in the present invention is represented by the equivalent sphere diameter by the laser diffracting and scattering method.

The self-dispersible resin preferably has an acid value of 5.0 to 60.0. If the acid value is within the specified range, the dispersibility can be improved. In the present specification, the acid value of a resin means the number of mg of potassium hydroxide required to neutralize 1 g of the resin.

In the ink set used in the printing method of the present invention, it is possible to form a print layer having an excellent gloss with increasing the dot diameter of the water-based coloring ink and without causing bleeding by adjusting the acid value of the self-dispersible resin included in the water-based coloring ink and the cation degree of the water-soluble polymer having a cation included in the water-based coating liquid. Here, the ratio (A:B) of the acid value (A) of the self-dispersible resin to the cation degree (meq/g)(B) at pH 7.1 of the cationic polymer is preferably in the range of 10:1 to 1:1, more preferably in the range of 6:1 to 1.5:1, and even more preferably in the range of 3:1 to 2:1.

The resin content in the water-based coloring ink is preferably 1 to 10% by mass. In addition, the proportion of the self-dispersible resin in the resin is preferably 50% by mass or more.

The water-based coloring ink is not particularly limited, and pigments such as organic pigments and inorganic pigments usually used as colorants in the ink industry can be used, but it is preferable to include a self-dispersible pigment. The self-dispersible pigment is a pigment that can maintain a dispersed state in an ink without using a pigment dispersant, and is usually obtained by imparting a functional group having excellent hydrophilicity to the surface. The present inventor has found that a combination of the above-mentioned water-soluble polymer having a cation, particularly a water-soluble polymer having a quaternary ammonium cation and a self-dispersible pigment can prevent the formation of unevenness on the surface of the print layer due to too quick occurrence of aggregation, and thereby it can prevent the deterioration of the gloss of the print layer.

In the present invention, as the self-dispersible pigment, a pigment in which anions such as carboxyl ion, sulfate ion, nitrate ion, phosphate ion and hydroxide ion are directly bonded to the surface is preferable. By using such an anion-type self-dispersible pigment, the pigment can be stably dispersed in the ink without adding a dispersant, and a clearer image can be printed. Commercially available products can be preferably used as these anion-type self-dispersible pigments.

Examples of the pigments include Pigment Yellow 12, 13, 14, 17, 20, 24, 31, 42, 53, 55, 74, 83, 86, 93, 109, 110, 117, 120, 122, 125, 128, 129, 137, 138, 139, 147, 148, 150, 151, 152, 153, 154, 155, 166, 168, 180, 181, 184, 185, 213; Pigment Orange 16, 36, 38, 43, 51, 55, 59, 61, 64, 65, 71; Pigment Red 9, 48, 49, 52, 53, 57, 97, 101, 122, 123, 149, 168, 177, 180, 192, 202, 206, 215, 216, 217, 220, 223, 224, 226, 227, 228, 238, 240, 244, 254; Pigment Violet 19, 23, 29, 30, 32, 37, 40, 50; Pigment Blue 15, 15: 1, 15: 3, 15: 4, 15: 6, 22, 27, 28, 29, 30, 60, 64, 80; Pigment Green 7, 36; Pigment Brown 23, 25, 26; and Pigment Black 1, 7, 26, 27, 28, Pigment White 6, and the like. These pigments may be used alone, or in combination of two or more.

Examples of pigments that can be used for cyan ink include Pigment Blue 15, 15: 1, 15: 3, 15: 4, 15: 6, 22, 27, 28, 29, 30, 60, 64, 80 and the like.

Examples of pigments that can be used for magenta ink include Pigment Red 9, 48, 49, 52, 53, 57, 97, 101, 122, 123, 149, 168, 177, 180, 192, 202, 206, 215, 216, 217, 220, 223, 224, 226, 227, 228, 238, 240, 244, 254 and the like.

Examples of pigments that can be used for yellow ink include Pigment Yellow 12, 13, 14, 17, 20, 24, 31, 42, 53, 55, 74, 83, 86, 93, 109, 110, 117, 120, 122, 125, 128, 129, 137, 138, 139, 147, 148, 150, 151, 152, 153, 154, 155, 166, 168, 180, 181, 184, 185, 213 and the like.

Examples of pigments that can be used for black ink include Pigment Black 1, 7, 26, 27, 28 and the like.

Other pigments including Pigment Orange 16, 36, 38, 43, 51, 55, 59, 61, 64, 65, 71; Pigment Violet 19, 23, 29, 30, 32, 37, 40, 50; Pigment Green 7, 36; Pigment Brown 23, 25, 26; Pigment White 6 and the like can also be used for the basic color inks described above, and can also be used as special color inks such as orange ink, violet ink, green ink, and red ink.

The content of the pigment in the water-based coloring ink can be arbitrarily determined depending on the type of the pigment used and the like, but is preferably 0.5 to 10% by mass.

The organic solvent that can be used for the water-based coloring ink and the water-based coating liquid is not particularly limited, and an organic solvent that is usually used in the ink industry can be used. It can be exemplified that the content of the organic solvent in the water-based coloring ink and the water-based coating liquid is 5 to 49% by mass, but it can also be adjusted preferably in the low range of 5 to 35% by mass, more preferably 10 to 35% by mass, and particularly preferably 15 to 35% by mass. With this, it is possible to provide a water-based coating liquid having less impact on the environment, and since the organic solvent is less likely to remain in the coating film, it is easy to improve the physical properties of the film such as scratch resistance.

The organic solvent that can be used for the water-based coloring ink and the water-based coating liquid is preferably a water-soluble solvent, and from the viewpoint of improving the ejection stability, wettability, and storage stability of the ink and coating liquid, the water-soluble solvent preferably includes at least one selected from the group consisting of diol compounds, glycol ether compounds, 3- to 5-membered ring lactone compounds, and amide compounds. In addition, from the viewpoint of adjusting the dynamic surface tension value of the ink and the coating liquid, it is preferable to include at least one type (preferably at least two types) selected from the group consisting of diol compounds and glycol ether compounds, and particularly, from the viewpoint of adjusting the dynamic surface tension value of the coating liquid, it is preferable to include both a diol compound and a glycol ether compound. Here, when both the diol compound and the glycol ether compound are included, the mass ratio (D: G) of the diol compound (D) to the glycol ether compound (G) is preferably in the range of 8:1 to 1:8, and preferably in the range of 5:1 to 1:5.

The diol compound is a compound having two hydroxyl groups, and includes, for example, ethylene glycol, propylene glycol, 2-methyl-1,3-propanediol, 1,2-butanediol, 1,3-butanediol, 1,4-butanediol, 1,2-pentanediol, 1,2-hexanediol, 1,6-hexanediol, 1,2-heptandiol, 1,2-octanediol, 1,9-nonanediol, 1,10-decanediol and the like. Among these, propylene glycol, 1,2-butanediol, 1,3-butanediol, 1,4-butanediol, and 1,2-hexanediol are preferable.

Specific examples of the glycol ether compound include ethylene glycol ethers such as ethylene glycol methyl ether, ethylene glycol ethyl ether, ethylene glycol propyl ether, ethylene glycol butyl ether, ethylene glycol pentyl ether, ethylene glycol hexyl ether, ethylene glycol cyclohexyl ether, ethylene glycol phenyl ether, ethylene glycol benzyl ether, ethylene glycol isobutyl ether, ethylene glycol tertiary butyl ether, diethylene glycol methyl ether, diethylene glycol ethyl ether, diethylene glycol propyl ether, diethylene glycol butyl ether, diethylene glycol pentyl ether, diethylene glycol hexyl ether, diethylene glycol cyclohexyl ether, diethylene glycol phenyl ether, diethylene glycol benzyl ether, diethylene glycol monobutyl ether, diethylene glycol isobutyl ether, triethylene glycol methyl ether, triethylene glycol ethyl ether, triethylene glycol propyl ether, triethylene glycol butyl ether, triethylene glycol pentyl ether, triethylene glycol hexyl ether, triethylene glycol cyclohexyl ether, triethylene glycol phenyl ether, triethylene glycol benzyl ether and triethylene glycol monobutyl ether; and propylene glycol ethers such as propylene glycol methyl ether, propylene glycol ethyl ether, propylene glycol propyl ether, propylene glycol butyl ether, propylene glycol pentyl ether, propylene glycol hexyl ether, propylene glycol cyclohexyl ether, dipropylene glycol methyl ether, dipropylene glycol ethyl ether, dipropylene glycol propyl ether, dipropylene glycol butyl ether, dipropylene glycol pentyl ether, dipropylene glycol hexyl ether, dipropylene glycol cyclohexyl ether, tripropylene glycol methyl ether, tripropylene glycol ethyl ether, tripropylene glycol propyl ether, tripropylene glycol butyl ether, tripropylene glycol pentyl ether, tripropylene glycol hexyl ether and tripropylene glycol cyclohexyl ether. Among these, ethylene glycol monobutyl ether, ethylene glycol isobutyl ether, ethylene glycol tertiary butyl ether, diethylene glycol monobutyl ether, diethylene glycol isobutyl ether and triethylene glycol monobutyl ether, dipropylene glycol monomethyl ether, dipropylene glycol monoethyl ether, dipropylene glycol monopropyl ether and triethylene glycol monobutyl ether are preferable.

The three- to five-membered ring lactone compound is a compound having a three-membered ring in which the number of atoms constituting the ring is three, a four-membered ring in which the number of atoms constituting the ring is four or a five-membered ring in which the number of atoms constituting the ring is five among the compounds having the lactone ring partially including —C(=O)—O—. Specific examples include α-acetolactone, β-propionlactone, γ-butyrolactone, δ-valerolactone and the like. Among these, γ-butyrolactone is preferable.

The amide compound is preferably an acyclic amide compound, and includes, for example, dimethylacetamide, dimethylformamide, sulfanylamide, toluenesulfonamide, benzenesulfonamide, N-dimethyl-β-methoxypropionamide, N,N-dimethyl-β-butoxy propionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β-octoxypropionamide, N,N-diethyl-β-methoxypropionamide, N,N-diethyl-β-butoxypropionamide, N,N-diethyl-β-pentoxypropionamide, N,N-diethyl-β-hexoxypropionamide, N,N-diethyl-β-heptoxypropionamide, N,N-diethyl-β-octoxypropionamide and the like. Among these, dimethylacetamide, dimethylformamide, N,N-dimethyl-β-methoxypropionamide, N,N-dimethyl-β-butoxypropionamide, N,N-diethyl-β-methoxypropionamide and N,N-diethyl-β-butoxypropionamide are preferable.

The water-based coating liquid preferably comprises a thickener from the viewpoint of improving ejection stability. By using a thickener, it is possible to prepare a coating liquid which has excellent ejection stability even if the coating liquid does not include a pigment or includes 0.1% by mass or less of a pigment, or even if the coating liquid has a small resin content, so that the amount of the organic solvent compounded can be reduced, and thereby, it is possible to provide a water-based coating liquid having a small impact on the environment. In the water-based coating liquid, the content of the thickener is preferably 0.01% by mass to 2% by mass, more preferably 0.10% by mass to 1% by mass, and still more preferably 0.20% by mass to 0.80% by mass.

When the water-based coating liquid is used in an inkjet printer, the thickener preferably has a low effect of imparting thixotropic property or has no effect of imparting thixotropic property. From such a viewpoint, the thickener used in the water-based coating liquid preferably includes a nonionic water-soluble thickener, and as the nonionic water-soluble thickener, a urethane polymer is preferable, and a polyether polyol-based urethane polymer is more preferable. The ratio of the nonionic water-soluble thickener to the thickener is preferably 50% by mass or more.

In the present invention, the water-soluble thickener means a thickener that dissolves in water or an aqueous solution containing less than 50% by mass of a water-soluble organic solvent.

Commercially available thickeners can be used, and examples of the polyether polyol urethane polymer include Adecanol UH-530, UH-541VF, UH-438, UH-450VF (all manufactured by ADEKA Corporation), and SN Thickeners 612, 619, 612NC, 621N, 621TF, 623N, 625N (all manufactured by San Nopco Ltd.) and the like. The thickener may be used alone, or in combination of two or more.

In the water-based coloring ink and the water-based coating liquid, if necessary, a pH conditioner, a surface conditioner (preferably a polyether-modified silicone-based surface conditioner), a defoamer, a moisturizer, a wet dispersant, a preservative and a fungicide, a dissolution aid, an antioxidant, a metal trapping agent and the like may be appropriately selected and compounded within a range that does not impair the object of the present invention.

The water-based coloring ink and the water-based coating liquid can be prepared by mixing various components appropriately selected as necessary.

The water-based coating liquid preferably comprises water in the range of 50% by mass to 90% by mass, an organic solvent in the range of 5% by mass to 35% by mass, and a resin in the range of 0.005% by mass to 5% by mass. Such a water-based coating liquid having a small amount of resin dries quickly, and is preferable from the viewpoint of suppressing the generation of printing streaks after aggregation.

The pH of the water-based coating liquid is preferably in the range of 7.01 to 10.0. By setting the pH of the water-based coating liquid in such a basic region, it is possible to suppress the occurrence of corrosion in metal parts (particularly print heads) of printing equipment such as printers.

On the other hand, the pH of the water-based coloring ink changes depending on the type of pigment selected and the like, but for the same reason, it is preferably basic, and the pH is preferably in the range of 7.01 to 10.0.

A pH conditioner can be used for adjusting the pH, and it is preferable to use an amine compound, and it is more preferable to use an amine compound having a boiling point of 70 to 270° C. The amine compound has the effect of appropriately adjusting the pH in the water-based coating liquid and further preventing the aggregation of the resin. In addition, by compounding the amine compound in the coating liquid, it is possible to make corrosion less likely to occur. Furthermore, if the boiling point of the amine compound is in the range of 70 to 270° C., it is difficult to evaporate, the amine compound stays in the water-based coloring ink or water-based coating liquid for a long period of time, the ejecting stability of the water-based coloring ink or water-based coating liquid is excellent for a long period of time, and the gloss of the print layer tends to be high. Specific examples of the amine compound having a boiling point of 70 to 270° C. include N-methyldiethanolamine, N-ethyldiethanolamine, N,N-dimethylethanolamine, N,N-diethylethanolamine and the like. These amine compounds may be used alone, or in combination of two or more. The content of the amine compound in the water-based coloring ink and the water-based coating liquid is preferably 0.1 to 2.0% by mass.

In the ink set of the present invention, it is preferable that the water-based coloring ink and the water-based coating liquid each independently have a viscosity in the range of 3.0 to 10.0 mPa·s at 25° C. from the viewpoint of being used in an inkjet printer. Note that the viscosity of the ink is measured using a rheometer ARES manufactured by TA Instruments after adjusting the liquid temperature to 25° C.

The ink set of the present invention can be used for various inkjet printers. Such an inkjet printer comprises a print head, and ejects inks constituting an ink set in the form of droplets from a nozzle of the print head.

Next, the printing method of the present invention will be described in detail. The printing method of the present invention is a printing method in which a print layer is formed on a substrate by an inkjet printer provided with the above-mentioned ink set of the present invention, comprising: ejecting the water-based coating liquid from a print head to land coating droplets on the substrate; and ejecting the water-based coloring ink from the print head to land ink droplets on the coating liquid to form the print layer. According to the printing method of the present invention, it is possible to suppress the occurrence of expansion or shrinkage in the print layer and stably print a high-definition image.

In the printing method, the substrate is not particularly limited, and the printing method of the present invention is also suitable for printing on, for example, metal substrates such as steel, zinc-plated steel (for example, zinc plate), tin-plated steel (for example, tin plate), stainless steel, magnesium alloys, aluminum and aluminum alloys; inorganic substrates such as glass and ceramics; non-ink-absorbing substrates (non-absorbent substrates) such as plastic substrates such as acrylic resin, polyvinyl chloride, polycarbonate, ABS resin, polyethylene terephthalate, and polyolefin; and substrates that do not easily absorb ink and coating liquid by surface coating (poorly absorbable substrates) such as coated paper, art paper, cast paper, finely coated paper. Examples of other substrates include paper substrates such as high-quality paper, synthetic paper, and inkjet paper; and inorganic substrates such as wood, gypsum, calcium silicate, concrete, cement, mortar, and slate and the like. The substrate may be subjected to general surface treatment such as primer treatment or corona treatment in order to improve the adhesion to the print layer.

In the printing method of the present invention, the temperature of the substrate is preferably 30 to 45° C. With this, the water-based coating liquid can be uniformly wetted and expanded on the substrate. Note that the temperature of the substrate is the temperature of the surface of the substrate on which the coating droplets land.

In the printing method, ink droplets of the water-based coloring ink can be landed in the water-based coating liquid without waiting for the water-based coating liquid to dry (that is, without drying the water-based coating liquid). In the printing method, the total ejected liquid thickness of the water-based primer ink and the water-based coloring ink immediately after printing (that is, before the water or the organic solvent evaporates) is preferably within the range of 1 to 20 μm.

In the printing method of the present invention, when the water-based coloring ink consists of a plurality of water-based coloring inks, the water-based coloring ink first landed on the coating liquid preferably has the lowest dynamic surface tension at 25° C. at a surface life of 100 ms among the plurality of water-based coloring inks. The water-based coloring ink that first lands on the coating liquid is most strongly affected by the aggregating acting of the coloring ink by the coating liquid. Therefore, by first landing the water-based coloring ink having the lowest dynamic surface tension on the coating liquid, the aggregating acting of the coloring ink by the coating liquid can be effectively exhibited.

The printing method of the present invention preferably further comprises a step of drying the print layer formed on the substrate with hot air. By applying hot air (usually using air) to the print layer to dry it, the resin included in the print layer can be fused onto the substrate to form a strong film. As a result, it is possible to provide a printed matter having excellent robustness. From the viewpoint of fusing the resin included in the print layer onto the substrate, the temperature of the hot air is preferably 70 to 130° C., more preferably 80 to 110° C. In addition, the drying time is preferably 2 seconds or more and 20 seconds or less, and more preferably 5 seconds or more and 15 seconds or less. The drying means is not particularly limited, but a dryer having a blowing function is preferable. The air volume is preferably 1.0 m³/min or more, and more preferably 1.5 to 5.0 m³/min.

The print layer finally formed in the printing method of the present invention means a print layer formed by landing ink droplets of a water-based coloring ink on a water-based coating liquid on a substrate and then curing and drying.

In the printing method of the present invention, the substrate may be printed with a white ink containing titanium oxide before the step of ejecting the water-based coating liquid from the print head and landing the ink droplets on the substrate. In addition, after the step of ejecting the water-based coloring ink from the print head and landing the ink droplets on the water-based coating liquid to form the print layer, the printing method of the present invention may further comprise the step of printing with a white ink containing titanium oxide to cover the print layer. A white print layer can be formed by printing with a white ink. Here, the white ink is an ink different from the water-based coloring ink constituting the ink set of the present invention mentioned above, and a known white ink can be used. In addition, the printing method is not particularly limited, but printing with an inkjet printer in combination with the ink set of the present invention is preferable.

In addition, in the printing method of the present invention, hot air can be also applied to the entire print layer comprising the white print layer and the print layer formed after the water-based coloring ink has landed to dry the print layer.

EXAMPLES

Hereinafter, the present invention will be described in more detail with reference to examples, but the present invention is not limited to the following examples.

<Preparation Example of Water-Based Coating Liquid>

Resins, amine compounds, water-soluble solvents, surface conditioners and ion-exchanged water were mixed by a known method to prepare water-based coating liquid 1 to 16 according to the formulation shown in Tables 1 and 2. The pH, static surface tension (25° C.), dynamic surface tension (25° C.) at a surface life of 100 ms, and viscosity (25° C.) of each water-based coating liquid were measured, and the obtained results are shown in Tables 1 and 2.

Note that the viscosities of the water-based coating liquid and the coloring ink described later are the viscosities (mPa·s) at 25° C.

The compounding agents listed in Tables 1 and 2 below are as follows.

*1 The following was used as the aqueous solution A of the water-soluble polymer having a quaternary ammonium cation.

Catiomaster PE-30 (manufactured by Yokkaichi Chemical Co., Ltd., dimethylamine-ethylenediamine-epichlorohydrin-based polymer resin, resin content 50% by mass, weight average molecular weight (Mw): 9000, cation degree at pH 7.1: 6.5 meq/g)

*2 The following was used as the aqueous solution B of the water-soluble polymer having a quaternary ammonium cation.

DK6851 (manufactured by Seiko PMC Corporation, polyamine resin, resin content: 70.0% by mass, cation degree at pH 7.1: 6.8 meq/g)

*3 The following was used as the aqueous solution C of the water-soluble polymer having a primary cation.

PAA-SA (manufactured by Knitbo Medical, allylamine amide sulfate polymer resin, resin content: 20% by mass, Mw: 12,000, cation degree at pH 7.1: 5.8 meq/g)

*4 WET270 (manufactured by EVONIK Industries, polyether-modified silicone oil, silicone oil content: 100% by mass, surface conditioner)

*5 Surflon S-241 (manufactured by AGC Seimi Chemical Co., Ltd., fluorine-based surfactant, fluorine-based surfactant content: 30% by mass, surface conditioner)

TABLE 1

| Raw materials | Coating liquid 1 | Coating liquid 2 | Coating liquid 3 | Coating liquid 4 | Coating liquid 5 | Coating liquid 6 | Coating liquid 7 | Coating liquid 8 |
|---|---|---|---|---|---|---|---|---|
| Aqueous solution A of water-soluble polymer having a quaternary ammonium cation (resin content: 50% by mass) *1 | 2.00 | 2.00 | 2.00 | 2.00 | 2.00 | 2.00 | | |
| Aqueous solution B of water-soluble polymer having a quaternary ammonium cation (resin content: 70% by mass) *2 | | | | | | | 1.43 | |
| Aqueous solution C of water-soluble polymer having a primary cation (resin content: 20% by mass) *3 | | | | | | | | 5.00 |
| Dimethylethanolamine | 1.00 | 1.00 | 1.00 | 1.00 | 1.00 | 1.00 | 1.00 | 1.00 |
| Diethylene glycol monobutyl ether | 10.00 | 10.00 | 10.00 | 10.00 | 10.00 | 10.00 | 10.00 | 10.00 |
| Dipropylene glycol monobutyl ether | | | | | | | | |
| 1,2-Hexanediol | | | | | | | | |

TABLE 1-continued

| Raw materials | | Coating liquid 1 | Coating liquid 2 | Coating liquid 3 | Coating liquid 4 | Coating liquid 5 | Coating liquid 6 | Coating liquid 7 | Coating liquid 8 |
|---|---|---|---|---|---|---|---|---|---|
| 1,4-Butanediol | | 20.00 | 20.00 | 20.00 | 20.00 | 20.00 | 20.00 | 20.00 | 20.00 |
| WET270*4 | | 0.40 | 0.80 | 0.10 | 0.05 | 0.03 | 0.01 | 0.40 | 0.40 |
| Surflon S-241*5 | | | | | | | | | |
| Ion-exchanged water | | 66.60 | 66.20 | 66.90 | 66.95 | 66.97 | 66.99 | 67.17 | 63.60 |
| Total mass parts | | 100.00 | 100.00 | 100.00 | 100.00 | 100.00 | 100.00 | 100.00 | 100.00 |
| Each physical property value | pH | 7.3 | 7.3 | 7.2 | 7.2 | 7.2 | 7.2 | 7.1 | 7.6 |
| | Static surface tension (mN/m) | 21.3 | 21.1 | 24.5 | 25.5 | 25.5 | 26.5 | 21.3 | 21.5 |
| | Dynamic surface tension (mN/m, 100 ms) | 26.1 | 23.1 | 29.8 | 32.5 | 34.6 | 37.8 | 26.7 | 27.0 |
| | Viscosity (mPa · s) | 5.9 | 6.3 | 5.7 | 5.7 | 5.7 | 5.5 | 5.7 | 5.3 |

TABLE 2

| Raw materials | | Coating liquid 9 | Coating liquid 10 | Coating liquid 11 | Coating liquid 12 | Coating liquid 13 | Coating liquid 14 | Coating liquid 15 | Coating liquid 16 |
|---|---|---|---|---|---|---|---|---|---|
| Aqueous solution A of water-soluble polymer having a quaternary ammonium cation (resin content: 50% by mass) *1 | | 4.50 | 0.02 | 0.006 | 2.00 | 2.00 | 2.00 | 2.00 | 2.00 |
| Aqueous solution B of water-soluble polymer having a quaternary ammonium cation (resin content: 70% by mass) *2 | | | | | | | | | |
| Aqueous solution C of water-soluble polymer having a primary cation (resin content: 20% by mass) *3 | | | | | | | | | |
| Dimethylethanolamine | | 1.00 | 1.00 | 1.00 | 1.00 | 1.00 | 1.00 | 1.00 | 1.00 |
| Diethylene glycol monobutyl ether | | 10.00 | 10.00 | 10.00 | | | 5.00 | 15.00 | 10.00 |
| Dipropylene glycol monobutyl ether | | | | | 10.00 | | | | |
| 1,2-Hexanediol | | | | | | 10.00 | | | |
| 1,4-Butanediol | | 20.00 | 20.00 | 20.00 | 20.00 | 20.00 | 25.00 | 15.00 | 20.00 |
| WET270*4 | | 0.40 | 0.40 | 0.40 | 0.40 | 0.40 | 0.40 | 0.40 | |
| Surflon S-241*5 | | | | | | | | | 0.33 |
| Ion-exchanged water | | 64.10 | 68.58 | 68.59 | 66.60 | 66.60 | 66.60 | 66.60 | 67.00 |
| Total mass parts | | 100.00 | 100.00 | 100.00 | 100.00 | 100.00 | 100.00 | 100.00 | 100.00 |
| Each physical property value | pH | 7.1 | 7.7 | 8.0 | 7.5 | 7.2 | 7.3 | 7.3 | 7.5 |
| | Static surface tension (mN/m) | 21.8 | 21.4 | 21.5 | 21.0 | 22.5 | 21.1 | 24.5 | 17.5 |
| | Dynamic surface tension (mN/m, 100 ms) | 27.2 | 26.0 | 25.9 | 25.9 | 27.0 | 24.1 | 29.4 | 22.6 |
| | Viscosity (mPa · s) | 6.2 | 5.7 | 5.4 | 6.2 | 6.5 | 6.2 | 6.6 | 6.5 |

<Preparation Example of Water-Based Coloring Ink Including Self-Dispersible Pigment>

A water-based coloring ink including a self-dispersible pigment was prepared by mixing a self-dispersible pigment, a resin, a water-soluble solvent, a surface conditioner and an ion-exchanged water with a known method according to the formulation shown in Tables 3 to 4. The static surface tension (25° C.), the dynamic surface tension (25° C.) at a surface life of 100 ms, and the viscosity (25° C.) of each water-based coloring ink were measured, and the results obtained are shown in Tables 3 to 4.

TABLE 3

| Raw Materials | | Ink set 1 | | | | Ink set 2 | | | |
|---|---|---|---|---|---|---|---|---|---|
| | | Cyan ink 1 | Magenta ink 1 | Yellow ink 1 | Black ink 1 | Cyan ink 2 | Magenta ink 2 | Yellow ink 2 | Black ink 2 |
| Self-dispersible pigment aqueous dispersion *6 | CAB-O-JET 250C (pigment content: 10% by mass) | 20.00 | | | | 20.00 | | | |
| | CAB-O-JET-465M (pigment content: 15% by mass) | | 20.00 | | | | 20.00 | | |
| | CAB-O-JET 270Y (pigment content: 10% by mass) | | | 30.00 | | | | 30.00 | |
| | CAB-O-JET 300 (pigment content: 15% by mass) | | | | 20.00 | | | | 20.00 |
| Resin | Resin dispersion D (resin content: 38% by mass) *7 | 13.16 | 13.16 | 13.16 | 13.16 | 13.16 | 13.16 | 13.16 | 13.16 |
| Water-soluble solvent | Diethylene glycol monobutyl ether | 5.00 | 5.00 | 5.00 | 5.00 | 5.00 | 5.00 | 5.00 | 5.00 |
| | Dimethylethanolamine | 1.00 | 1.00 | 1.00 | 1.00 | 1.00 | 1.00 | 1.00 | 1.00 |
| | 1,4-Butanediol | 20.00 | 20.00 | 20.00 | 20.00 | 20.00 | 20.00 | 20.00 | 20.00 |
| Surface conditioner | WET280*8 | 0.600 | 0.600 | 0.600 | 0.600 | 0.200 | 0.200 | 0.200 | 0.200 |
| Water | Ion-exchanged water | 40.24 | 40.24 | 30.24 | 40.24 | 40.64 | 40.64 | 30.64 | 40.64 |
| Total mass parts | | 100.00 | 100.00 | 100.00 | 100.00 | 100.00 | 100.00 | 100.00 | 100.00 |
| Each physical property value | Static surface tension (mN/m) | 25.6 | 26.3 | 27.1 | 26.5 | 35.0 | 36.2 | 36.7 | 35.8 |
| | Dynamic surface tension (mN/m, 100 ms) | 37.2 | 38.4 | 38.7 | 37.5 | 42.0 | 44.0 | 43.8 | 43.8 |
| | Viscosity (mPa·s) | 6.1 | 6.1 | 6.4 | 5.9 | 5.8 | 5.9 | 6.1 | 5.8 |

| Raw Materials | | Ink set 3 | | | |
|---|---|---|---|---|---|
| | | Cyan ink 3 | Magenta ink 3 | Yellow ink 3 | Black ink 3 |
| Self-dispersible pigment aqueous dispersion *6 | CAB-O-JET 250C (pigment content: 10% by mass) | 20.00 | | | |
| | CAB-O-JET-465M (pigment content: 15% by mass) | | 20.00 | | |
| | CAB-O-JET 270Y (pigment content: 10% by mass) | | | 30.00 | |
| | CAB-O-JET 300 (pigment content: 15% by mass) | | | | 20.00 |
| Resin | Resin dispersion D (resin content: 38% by mass) *7 | 13.16 | 13.16 | 13.16 | 13.16 |
| Water-soluble solvent | Diethylene glycol monobutyl ether | 5.00 | 5.00 | 5.00 | 5.00 |
| | Dimethylethanolamine | 1.00 | 1.00 | 1.00 | 1.00 |
| | 1,4-Butanediol | 20.00 | 20.00 | 20.00 | 20.00 |
| Surface conditioner | WET280*8 | 0.020 | 0.020 | 0.020 | 0.020 |
| Water | Ion-exchanged water | 40.82 | 40.82 | 30.82 | 40.82 |
| Total mass parts | | 100.00 | 100.00 | 100.00 | 100.00 |
| Each physical property value | Static surface tension (mN/m) | 40.0 | 41.1 | 42.0 | 41.6 |
| | Dynamic surface tension (mN/m, 100 ms) | 52.5 | 53.6 | 54.0 | 53.7 |
| | Viscosity (mPa·s) | 5.6 | 5.7 | 6.0 | 5.6 |

TABLE 4

| | Raw Materials | Ink set 4 | | | | Ink set 5 | | | |
|---|---|---|---|---|---|---|---|---|---|
| | | Cyan ink 4 | Magenta ink 4 | Yellow ink 4 | Black ink 4 | Cyan ink 5 | Magenta ink 5 | Yellow ink 5 | Black ink 5 |
| Self-dispersible pigment aqueous dispersion *6 | CAB-O-JET 250C (pigment content: 10% by mass) | 20.00 | | | | 20.00 | | | |
| | CAB-O-JET-465M (pigment content: 15% by mass) | | 20.00 | | | | 20.00 | | |
| | CAB-O-JET 270Y (pigment content: 10% by mass) | | | 30.00 | | | | 30.00 | |
| | CAB-O-JET 300 (pigment content: 15% by mass) | | | | 20.00 | | | | 20.00 |
| Resin | Resin dispersion E (resin content: 40% by mass) *9 | 12.50 | 12.50 | 12.50 | 12.50 | | | | |
| | Resin dispersion F (resin content: 35% by mass) *10 | | | | | 14.28 | 14.28 | 14.28 | 14.28 |
| | Resin dispersion G (resin content: 35% by mass) *11 | | | | | | | | |
| Water-soluble solvent | Diethylene glycol monobutyl ether | 5.00 | 5.00 | 5.00 | 5.00 | 5.00 | 5.00 | 5.00 | 5.00 |
| | Dimethylethanolamine | 1.00 | 1.00 | 1.00 | 1.00 | 1.00 | 1.00 | 1.00 | 1.00 |
| | 1,4-Butanediol | 20.00 | 20.00 | 20.00 | 20.00 | 20.00 | 20.00 | 20.00 | 20.00 |
| Surface conditioner | WET280*8 | 0.600 | 0.600 | 0.600 | 0.600 | 0.600 | 0.600 | 0.600 | 0.600 |
| Water | Ion-exchanged water | 40.90 | 40.90 | 30.90 | 40.90 | 39.12 | 39.12 | 29.12 | 39.12 |
| Total mass parts | | 100.00 | 100.00 | 100.00 | 100.00 | 100.00 | 100.00 | 100.00 | 100.00 |
| Each physical property value | Static surface tension (mN/m) | 25.1 | 25.9 | 26.4 | 26.3 | 24.0 | 25.1 | 25.5 | 24.9 |
| | Dynamic surface tension(mN/m, 100 ms) | 36.5 | 37.2 | 37.1 | 36.5 | 34.5 | 35.1 | 34.8 | 34.9 |
| | Viscosity (mPa·s) | 6.2 | 6.3 | 6.2 | 6.1 | 6.5 | 6.6 | 6.4 | 6.2 |

| | | Ink set 6 | | | |
|---|---|---|---|---|---|
| | Raw Materials | Cyan ink 6 | Magenta ink 6 | Yellow ink 6 | Black ink 6 |
| Self-dispersible pigment aqueous dispersion *6 | CAB-O-JET 250C (pigment content: 10% by mass) | 20.00 | | | |
| | CAB-O-JET-465M (pigment content: 15% by mass) | | 20.00 | | |
| | CAB-O-JET 270Y (pigment content: 10% by mass) | | | 30.00 | |
| | CAB-O-JET 300 (pigment content: 15% by mass) | | | | 20.00 |
| Resin | Resin dispersion E (resin content: 40% by mass) *9 | | | | |
| | Resin dispersion F (resin content: 35% by mass) *10 | | | | |
| | Resin dispersion G (resin content: 35% by mass) *11 | 14.28 | 14.28 | 14.28 | 14.28 |

TABLE 4-continued

|  |  |  |  |  |  |  |
|---|---|---|---|---|---|---|
| | Water-soluble solvent | Diethylene glycol monobutyl ether | 5.00 | 5.00 | 5.00 | 5.00 |
| | | Dimethylethanolamine | 1.00 | 1.00 | 1.00 | 1.00 |
| | | 1,4-Butanediol | 20.00 | 20.00 | 20.00 | 20.00 |
| | Surface conditioner | WET280*8 | 0.600 | 0.600 | 0.600 | 0.600 |
| | Water | Ion-exchanged water | 39.12 | 39.12 | 29.12 | 39.12 |
| | Total mass parts | | 100.00 | 100.00 | 100.00 | 100.00 |
| | Each physical property value | Static surface tension (mN/m) | 24.7 | 25.1 | 25.3 | 25.0 |
| | | Dynamic surface tension(mN/m, 100 ms) | 35.0 | 35.5 | 35.7 | 35.2 |
| | | Viscosity (mPa · s) | 6.1 | 5.9 | 5.8 | 5.8 |

The compounding agents listed in Tables 3 to 4 described above are as follows.

*6 The following were used as the self-dispersible pigment dispersion.

CAB-O-JET 250C
(Manufactured by Cabot Corporation, self-dispersible pigment aqueous dispersion of cyan, pigment content: 10% by mass)

CAB-O-JET-465M
(Manufactured by Cabot Corporation, self-dispersible pigment aqueous dispersion of magenta, pigment content: 15% by mass)

CAB-O-JET 270Y
(Manufactured by Cabot Corporation, self-dispersible pigment aqueous dispersion of yellow, pigment content: 10% by mass)

CAB-O-JET 300K
(Manufactured by Cabot Corporation, self-dispersible pigment aqueous dispersion of black, pigment content: 15% by mass)

*7 The following was used as the resin dispersion D.
NEOREZ R-9621 (manufactured by DSM Coating Resins, polyester group-containing self-dispersible urethane resin, particle diameter: 50 nm, acid value: 18, resin content: 38% by mass)

*8 WET280 (manufactured by EVONIK Industries, polyether-modified silicone oil, silicone oil content: 100% by mass, surface conditioner)

*9 The following was used as the resin dispersion E.
NEOREZ R-967 (manufactured by DSM Coating Resins, polyether group-containing self-dispersible urethane resin, particle diameter: 60 nm, acid value: 15, resin content: 40% by mass)

*10 The following was used as the resin dispersion F.
Neo sticker HA-560 (manufactured by Nicca Chemical, polycarbonate group-containing self-dispersible urethane resin, particle diameter: 30 nm, acid value: 14, resin content: 35% by mass)

*11 The following was used as the resin dispersion G.
AE986B (manufactured by E-TEC, self-dispersible acrylic resin, particle diameter: 60 nm, acid value: 15, resin content: 35% by mass)

<Water-Based Coloring Ink Including Non-Self-Dispersible Pigment>

According to the formulation shown in Tables 5 to 6, the resin and surface conditioner were added to a water-based coloring dispersion in which a non-self-dispersible pigment, defoamer, water-soluble solvent, wet dispersant, and ion-exchanged water were dispersed by a known method to prepare a water-based coloring ink including a non-self-dispersible pigment. The static surface tension (25° C.), the dynamic surface tension (25° C.) at a surface life of 100 ms, and the viscosity (25° C.) of each water-based coloring ink were measured, and the results obtained are shown in Tables 5 to 6.

TABLE 5

| | | | Ink set 7 | | | | Ink set 8 | | | |
|---|---|---|---|---|---|---|---|---|---|---|
| | Raw Materials | | Cyan ink 7 | Magenta ink 7 | Yellow ink 7 | Black ink 7 | Cyan ink 8 | Magenta ink 8 | Yellow ink 8 | Black ink 8 |
| Water-based coloring dispersion including non-self-dispersible pigment | Non-self-dispersible pigment *12 | FASTOGEN Blue FA5380 | 2.00 | | | | 2.00 | | | |
| | | Shinkasha Magenta RT | | 3.00 | | | | 3.00 | | |
| | | Hostaperm Yellow H5G | | | 3.00 | | | | 3.00 | |
| | | Nerox-1000 | | | | 3.00 | | | | 3.00 |
| | Defoamer *13 | SN Defoamer 1312 | 0.01 | 0.01 | 0.01 | 0.01 | 0.01 | 0.01 | 0.01 | 0.01 |
| | Water-soluble solvent | Diethylene glycol monobutyl ether | 5.00 | 5.00 | 5.00 | 5.00 | 5.00 | 5.00 | 5.00 | 5.00 |
| | | Dimethylethanolamine | 1.00 | 1.00 | 1.00 | 1.00 | 1.00 | 1.00 | 1.00 | 1.00 |
| | | 1,4-Butanediol | 20.00 | 20.00 | 20.00 | 20.00 | 20.00 | 20.00 | 20.00 | 20.00 |
| | Wet dispersant *14 | Neugen EA-157 | 0.600 | 0.600 | 0.600 | 0.600 | 0.200 | 0.200 | 0.200 | 0.200 |

TABLE 5-continued

| | | | | | | | | | | |
|---|---|---|---|---|---|---|---|---|---|---|
| | Water | Ion-exchanged water | 57.73 | 56.73 | 56.73 | 56.73 | 58.53 | 57.53 | 57.53 | 57.53 |
| Resin | | Resin dispersion D (resin content: 38% by mass) *7 | 13.16 | 13.16 | 13.16 | 13.16 | 13.16 | 13.16 | 13.16 | 13.16 |
| Surface conditioner | | WET280*8 | 0.500 | 0.500 | 0.500 | 0.500 | 0.100 | 0.100 | 0.100 | 0.100 |
| Total mass parts | | | 100.00 | 100.00 | 100.00 | 100.00 | 100.00 | 100.00 | 100.00 | 100.00 |
| Each physical property value | Static surface tension (mN/m) | | 26.2 | 27.0 | 27.5 | 26.8 | 36.1 | 37.2 | 37.8 | 37.0 |
| | Dynamic surface tension (mN/m, 100 ms) | | 37.5 | 39.0 | 39.3 | 38.8 | 43.0 | 44.4 | 45.0 | 44.1 |
| | Viscosity (mPa · s) | | 6.8 | 6.5 | 6.7 | 6.2 | 6.4 | 6.2 | 6.3 | 6.0 |

| | | | | Ink set 9 | | | |
|---|---|---|---|---|---|---|---|
| | | Raw Materials | | Cyan ink 9 | Magenta ink 9 | Yellow ink 9 | Black ink 9 |
| Water-based coloring dispersion including non-self-dispersible pigment | Non-self-dispersible pigment *12 | FASTOGEN Blue FA5380 | | 2.00 | | | |
| | | Shinkasha Magenta RT | | | 3.00 | | |
| | | Hostaperm Yellow H5G | | | | 3.00 | |
| | | Nerox-1000 | | | | | 3.00 |
| | Defoamer *13 | SN Defoamer 1312 | | 0.01 | 0.01 | 0.01 | 0.01 |
| | Water-soluble solvent | Diethylene glycol monobutyl ether | | 5.00 | 5.00 | 5.00 | 5.00 |
| | | Dimethylethanolamine | | 1.00 | 1.00 | 1.00 | 1.00 |
| | | 1,4-Butanediol | | 20.00 | 20.00 | 20.00 | 20.00 |
| | Wet dispersant *14 | Neugen EA-157 | | 0.020 | 0.020 | 0.020 | 0.020 |
| | Water | Ion-exchanged water | | 58.71 | 57.71 | 57.71 | 57.71 |
| Resin | | Resin dispersion D (resin content: 38% by mass) *7 | | 13.16 | 13.16 | 13.16 | 13.16 |
| Surface conditioner | | WET280*8 | | 0.100 | 0.100 | 0.100 | 0.100 |
| Total mass parts | | | | 100.00 | 100.00 | 100.00 | 100.00 |
| Each physical property value | Static surface tension (mN/m) | | | 42.0 | 43.1 | 43.5 | 42.5 |
| | Dynamic surface tension (mN/m, 100 ms) | | | 53.1 | 53.6 | 53.6 | 53.6 |
| | Viscosity (mPa · s) | | | 6.2 | 5.9 | 6.0 | 5.7 |

TABLE 6

| | | | Ink set 10 | | | | Ink set 11 | | | |
|---|---|---|---|---|---|---|---|---|---|---|
| | | Raw Materials | Cyan ink 10 | Magenta ink 10 | Yellow ink 10 | Black ink 10 | Cyan ink 11 | Magenta ink 11 | Yellow ink 11 | Black ink 11 |
| Water-based coloring dispersion including non-self-dispersible pigment | Non-self-dispersible pigment *12 | FASTOGEN Blue FA5380 | 2.00 | | | | 2.00 | | | |
| | | Shinkasha Magenta RT | | 3.00 | | | | 3.00 | | |
| | | Hostaperm Yellow H5G | | | 3.00 | | | | 3.00 | |
| | | Nerox-1000 | | | | 3.00 | | | | 3.00 |
| | Defoamer *13 | SN Defoamer 1312 | 0.01 | 0.01 | 0.01 | 0.01 | 0.01 | 0.01 | 0.01 | 0.01 |
| | Water-soluble solvent | Diethylene glycol monobutyl ether | 5.00 | 5.00 | 5.00 | 5.00 | 5.00 | 5.00 | 5.00 | 5.00 |
| | | Dimethylethanolamine | 1.00 | 1.00 | 1.00 | 1.00 | 1.00 | 1.00 | 1.00 | 1.00 |
| | | 1,4-Butanediol | 20.00 | 20.00 | 20.00 | 20.00 | 20.00 | 20.00 | 20.00 | 20.00 |
| | Wet dispersant *14 | Neugen EA-157 | 0.600 | 0.600 | 0.600 | 0.600 | 0.200 | 0.200 | 0.200 | 0.200 |
| | Water | Ion-exchanged water | 58.29 | 57.29 | 57.29 | 57.29 | 56.91 | 55.91 | 55.91 | 55.91 |
| Resin | | Resin dispersion E (resin content: 40% by mass) *9 | 12.50 | 12.50 | 12.50 | 12.50 | | | | |

TABLE 6-continued

| | | | | | | | | | |
|---|---|---|---|---|---|---|---|---|---|
| | Resin dispersion F (resin content: 35% by mass) *10 | | | | | 14.28 | 14.28 | 14.28 | 14.28 |
| | Resin dispersion G (resin content: 35% by mass) *11 | | | | | | | | |
| Surface conditioner | WET280*8 | 0.600 | 0.600 | 0.600 | 0.600 | 0.600 | 0.600 | 0.600 | 0.600 |
| Total mass parts | | 100.00 | 100.00 | 100.00 | 100.00 | 100.00 | 100.00 | 100.00 | 100.00 |
| Each physical property value | Static surface tension (mN/m) | 24.2 | 25.1 | 24.9 | 25.0 | 23.9 | 24.5 | 24.7 | 24.0 |
| | Dynamic surface tension (mN/m, 100 ms) | 34.1 | 35.2 | 34.9 | 35.1 | 33.8 | 34.1 | 34.3 | 33.9 |
| | Viscosity (mPa · s) | 6.2 | 6.1 | 6.2 | 6.3 | 6.2 | 6.3 | 6.1 | 6.1 |

| | | | | Ink set 12 | | | |
|---|---|---|---|---|---|---|---|
| | | Raw Materials | | Cyan ink 12 | Magenta ink 12 | Yellow ink 12 | Black ink 12 |
| Water-based coloring dispersion including non-self-dispersible pigment | Non-self-dispersible pigment *12 | FASTOGEN Blue FA5380 | | 2.00 | | | |
| | | Shinkasha Magenta RT | | | 3.00 | | |
| | | Hostaperm Yellow H5G | | | | 3.00 | |
| | | Nerox-1000 | | | | | 3.00 |
| | Defoamer *13 | SN Defoamer 1312 | | 0.01 | 0.01 | 0.01 | 0.01 |
| | Water-soluble solvent | Diethylene glycol monobutyl ether | | 5.00 | 5.00 | 5.00 | 5.00 |
| | | Dimethylethanolamine | | 1.00 | 1.00 | 1.00 | 1.00 |
| | | 1,4-Butanediol | | 20.00 | 20.00 | 20.00 | 20.00 |
| | Wet dispersant *14 | Neugen EA-157 | | 0.020 | 0.020 | 0.020 | 0.020 |
| | Water | Ion-exchanged water | | 57.09 | 56.09 | 56.09 | 56.09 |
| Resin | | Resin dispersion E (resin content: 40% by mass) *9 | | | | | |
| | | Resin dispersion F (resin content: 35% by mass) *10 | | | | | |
| | | Resin dispersion G (resin content: 35% by mass) *11 | | 14.28 | 14.28 | 14.28 | 14.28 |
| Surface conditioner | | WET280*8 | | 0.600 | 0.600 | 0.600 | 0.600 |
| Total mass parts | | | | 100.00 | 100.00 | 100.00 | 100.00 |
| Each physical property value | Static surface tension (mN/m) | | | 24.5 | 25.1 | 25.0 | 24.9 |
| | Dynamic surface tension (mN/m, 100 ms) | | | 34.2 | 35.4 | 35.5 | 35.5 |
| | Viscosity (mPa · s) | | | 6.3 | 6.3 | 6.4 | 6.2 |

The compounding agents listed in Tables 5 to 6 described above are as follows. The compounding agents already described will be omitted.

*12 The following were used as non-self-dispersible pigments.

FASTOGEN Blue FA5380 (phthalocyanine blue, cyan pigment manufactured by DIC Corporation)

Shinkasha Magenta RT (dichloroquinacridone, magenta pigment manufactured by BASF)

Hostaperm Yellow H5G (Quinoxaline Zion, yellow pigment manufactured by Clariant Ltd.)

Nerox-1000 (carbon black, manufactured by Orion Engineered Carbons, black pigment)

*13 Defoamer (SN Defoamer 1312, manufactured by San Nopco Ltd.)

*14 Wet dispersant (Neugen EA-157, manufactured by DKS Co., Ltd.)

<Image Fineness at High-Speed Printing>

Using Stage JET manufactured by Tritech, first, water-based coating droplets were ejected in a single pass for 70% solid image at a transfer speed under the high speed printing condition of 12 pL, 25 m/min, and the water-based coating droplets were landed on the surface of a polyethylene terephthalate sheet (hereinafter referred to as PET sheet). After that, without drying the water-based coating liquid, ink droplets of the first color ink, the second color ink, the third color ink and the fourth color ink were ejected in this order in a single pass to land on the landed water-based coating liquid at a transfer speed under the high-speed printing condition of 12 pL and 25 m/min, and an image defined in JIS X9201 2001 N3A was printed to evaluate the dots after printing with a microscope. Here, the resolutions of the water-based coating liquid and the water-based coloring ink were set to vertical×horizontal=600×600 dpi. The evaluation criteria are as follows. Tables 7 to 14 show the configurations and evaluation results of the ink sets used.

◯+: Dots in the image exist independently.

◯: There is no problem when the entire image is visually viewed without shrinkage or expansion, but when confirmed with a microscope, the dots are partially mixed while maintaining their shape.

Δ (expand): In the dark color part in the image, the dot shape is retained, but the dots are partially united and there is no problem when viewed as a whole image, but it expands slightly, when viewed enlarged.

Δ (shrink): In the dark color part of the image, the dot shape is retained, but the dots are partially united and there is no problem when the entire image is viewed, but it shrinks slightly, when viewed enlarged.

x: The dot shape of the ink is not maintained, the image shrinkage or expansion is significant, and the image is clearly bad.

−: Dots in the image exist independently, and although there is no expansion or shrinkage in the image, print streaks are noticeable.

<Expansion and Shrinkage of the Print Layer During High-Speed Printing>

Using Stage JET manufactured by Tritech, first, water-based coating droplets were ejected in a single pass for 70% solid image at a transfer speed under the high speed printing condition of 12 pL, 25 m/min, and the water-based coating droplets were landed on the surface of a PET sheet. After that, without drying the water-based coating liquid, ink droplets of cyan ink were ejected in a single pass to land on the landed primer ink at a transfer speed under the high-speed printing condition of 12 pL and 25 m/min. At that time, the image to be printed is an image of lines having a vertical length of 30 mm and a horizontal length (width) of 5 mm, and 100% solid printing and 50% solid printing are alternately present at 5 mm intervals in the vertical direction. Then, the printed matter was evaluated using a microscope. Here, the resolutions of the water-based coating liquid and the water-based coloring ink were set to vertical×horizontal=600×600 dpi. The evaluation criteria are as follows. Tables 7 to 14 show the combinations of the water-based coating liquid used and the cyan ink and the evaluation results.

○: The expansion or shrinkage when each of 100% solid portion and 50% solid portion is compared to the specified width is less than 0.2 mm.

Δ (expand): Only 100% solid portion expands by the range of 0.2 mm or more and less than 0.4 mm compared to the specified width.

× (expand): 100% solid portion expands from the specified width by 0.4 mm or more, or 50% solid portion is expanded to be wider than the specified width by 0.2 mm or more.

Δ (shrink): Only 100% solid portion shrinks by the range of 0.2 mm or more and less than 0.4 mm compared to the specified width.

× (shrink): 100% solid portion shrinks from the specified width by 0.4 mm or more, or 50% solid portion shrinks from the specified width by 0.2 mm or more.

<Adhesion Properties>

Using Stage JET manufactured by Tritek, first, water-based coating droplets were ejected in a single pass for 70% solid image at a transfer speed under the high speed printing condition of 12 pL, 25 m/min, and the water-based coating droplets were landed on the surface of a PET sheet. After that, without drying the water-based coating liquid, ink droplets of cyan ink, magenta ink, and yellow ink were ejected in a single pass to land on the landed water-based coating liquid at a transfer speed under the high-speed printing condition of 12 pL and 25 m/min, and solid printing was performed with a print density of 80% for each ink and a total print density of 240%. Then, it was dried for 2 minutes at the temperature shown in Tables 7-14. A cellotape (registered trademark, manufactured by NICHIBAN Co., Ltd.) having a width of 24 mm was adhered to the printed portion, and then the tape was peeled off to visually evaluate the state of the peeled portion according to the following evaluation criteria. Here, the resolutions of the water-based coating liquid and the water-based coloring ink were set to vertical×horizontal=600×600 dpi. The evaluation criteria are as follows. Tables 7 to 14 show the configurations and evaluation results of the ink sets used.

○: No portion was peeled off.

Δ: Less than 50% of the taped part was peeled off.

×: More than 50% or the entire surface of the taped part was peeled off.

<Scratch Properties>

Using Stage JET manufactured by Tritek, first, water-based coating droplets were ejected in a single pass for 70% solid image at a transfer speed under the high speed printing condition of 12 pL, 25 m/min, and the water-based coating droplets were landed on the surface of a PET sheet. After that, without drying the water-based coating liquid, ink droplets of cyan ink, magenta ink, and yellow ink were ejected in a single pass to land on the landed water-based coating liquid at a transfer speed under the high-speed printing condition of 12 pL and 25 m/min, and solid printing was performed with a print density of 80% for each ink and a total print density of 240%. Then, it was dried for 2 minutes at the temperature shown in Tables 7-14. The printed portion was scratched 5 times with a cotton swab (registered trademark, manufactured by Hakujuji Co., Ltd.), and then visually evaluated according to the following evaluation criteria. Here, the resolutions of the water-based coating liquid and the water-based coloring ink were set to vertical×horizontal=600×600 dpi. The evaluation criteria are as follows. Tables 7 to 14 show the configurations and evaluation results of the ink sets used.

○: Ink does not peel off from PET sheet

×: Ink peels off from PET sheet

TABLE 7

| | | Example 1 | Example 2 | Example 3 | Example 4 | Example 5 | Example 6 | Example 7 |
|---|---|---|---|---|---|---|---|---|
| Water-based coloring ink | Ink set | Ink set 1 | Ink set 1 | Ink set 1 | Ink set 1 | Ink set 1 | Ink set 1 | Ink set 1 |
| | First color ink | Cyan ink 1 | Cyan ink 1 | Cyan ink 1 | Cyan ink 1 | Cyan ink 1 | Cyan ink 1 | Cyan ink 1 |
| | Second color ink | Magenta ink 1 | Magenta ink 1 | Magenta ink 1 | Magenta ink 1 | Magenta ink 1 | Magenta ink 1 | Magenta ink 1 |
| | Third color ink | Yellow ink 1 | Yellow ink 1 | Yellow ink 1 | Yellow ink 1 | Yellow ink 1 | Yellow ink 1 | Yellow ink 1 |
| | Fourth color ink | Black ink 1 | Black ink 1 | Black ink 1 | Black ink 1 | Black ink 1 | Black ink 1 | Black ink 1 |
| Water-based coating liquid | | Coating liquid 1 | Coating liquid 2 | Coating liquid 3 | Coating liquid 7 | Coating liquid 8 | Coating liquid 9 | Coating liquid 10 |
| Fineness of printed image at high-speed printing | | ○+ | Δ(Shrink) | Δ(Expand) | ○+ | ○+ | — | ○ |
| Expansion and shrinkage at high-speed printing | | ○ | Δ(Shrink) | Δ(Expand) | ○ | ○ | ○ | ○ |
| Adhesion properties | Drying temperature: 60° C. | Δ | Δ | Δ | Δ | Δ | Δ | Δ |
| | Drying temperature: 100° C. | ○ | ○ | ○ | ○ | ○ | ○ | ○ |

TABLE 7-continued

|  |  | Example 1 | Example 2 | Example 3 | Example 4 | Example 5 | Example 6 | Example 7 |
|---|---|---|---|---|---|---|---|---|
| Scratch properties | Drying temperature: 60° C. | Δ | Δ | Δ | Δ | Δ | Δ | Δ |
|  | Drying temperature: 100° C. | ○ | ○ | ○ | ○ | ○ | ○ | ○ |

TABLE 8

|  |  | Example 8 | Example 9 | Example 10 | Example 11 | Example 12 | Example 13 | Example 14 |
|---|---|---|---|---|---|---|---|---|
| Water-based coloring ink | Ink set | Ink set 1 | Ink set 1 | Ink set 1 | Ink set 1 | Ink set 1 | Ink set 2 | Ink set 1 |
|  | First color ink | Cyan ink 1 | Cyan ink 1 | Cyan ink 1 | Cyan ink 1 | Cyan ink 1 | Cyan ink 2 | Magenta ink 1 |
|  | Second color ink | Magenta ink 1 | Magenta ink 1 | Magenta ink 1 | Magenta ink 1 | Magenta ink 1 | Magenta ink 2 | Cyan ink 1 |
|  | Third color ink | Yellow ink 1 | Yellow ink 1 | Yellow ink 1 | Yellow ink 1 | Yellow ink 1 | Yellow ink 2 | Yellow ink 1 |
|  | Fourth color ink | Black ink 1 | Black ink 1 | Black ink 1 | Black ink 1 | Black ink 1 | Black ink 2 | Black ink 1 |
| Water-based coating liquid |  | Coating liquid 11 | Coating liquid 12 | Coating liquid 13 | Coating liquid 14 | Coating liquid 15 | Coating liquid 1 | Coating liquid 1 |
| Fineness of printed image at high-speed printing |  | Δ(Expand) | ○+ | ○ | Δ(Shrink) | ○ | Δ(Shrink) | Δ(Shrink) |
| Expansion and shrinkage at high-speed printing |  | Δ(Expand) | ○ | ○ | Δ(Shrink) | Δ(Expand) | Δ(Shrink) | ○ |
| Adhesion properties | Drying temperature: 60° C. | Δ | Δ | Δ | Δ | Δ | Δ | Δ |
|  | Drying temperature: 100° C. | ○ | ○ | ○ | ○ | ○ | ○ | ○ |
| Scratch properties | Drying temperature: 60° C. | Δ | Δ | Δ | Δ | Δ | Δ | Δ |
|  | Drying temperature: 100° C. | ○ | ○ | ○ | ○ | ○ | ○ | ○ |

TABLE 9

|  |  | Example 15 | Example 16 | Example 17 | Example 18 | Example 19 | Example 20 |
|---|---|---|---|---|---|---|---|
| Water-based coloring ink | Ink set | Ink set 1 | Ink set 1 | Ink set 4 | Ink set 5 | Ink set 6 | Ink set 1 |
|  | First color ink | Yellow ink 1 | Black ink 1 | Cyan ink 4 | Cyan ink 5 | Cyan ink 6 | Cyan ink 1 |
|  | Second color ink | Magenta ink 1 | Magenta ink 1 | Magenta ink 4 | Magenta ink 5 | Magenta ink 6 | Magenta ink 1 |
|  | Third color ink | Cyan ink 1 | Yellow ink 1 | Yellow ink 4 | Yellow ink 5 | Yellow ink 6 | Yellow ink 1 |
|  | Fourth color ink | Black ink 1 | Cyan ink 1 | Black ink 4 | Black ink 5 | Black ink 6 | Black ink 1 |
| Water-based coating liquid |  | Coating liquid 1 | Coating liquid 1 | Coating liquid 1 | Coating liquid 1 | Coating liquid 1 | Coating liquid 16 |
| Fineness of printed image at high-speed printing |  | Δ(Shrink) | Δ(Shrink) | ○+ | ○ | ○+ | Δ(Shrink) |
| Expansion and shrinkage at high-speed printing |  | ○ | ○ | ○ | ○ | ○ | Δ(Shrink) |
| Adhesion properties | Drying temperature: 60° C. | Δ | Δ | Δ | Δ | Δ | Δ |
|  | Drying temperature: 100° C. | ○ | ○ | ○ | Δ | Δ | ○ |
| Scratch properties | Drying temperature: 60° C. | Δ | Δ | Δ | ○ | Δ | Δ |
|  | Drying temperature: 100° C. | ○ | ○ | ○ | ○ | Δ | ○ |

TABLE 10

|  |  | Comparative example 1 | Comparative example 2 | Comparative example 3 | Comparative example 4 | Comparative example 5 |
|---|---|---|---|---|---|---|
| Water-based coloring ink | Ink set | Ink set 1 | Ink set 1 | Ink set 1 | Ink set 2 | Ink set 3 |
|  | First color ink | Cyan ink 1 | Cyan ink 1 | Cyan ink 1 | Cyan ink 2 | Cyan ink 3 |
|  | Second color ink | Magenta ink 1 | Magenta ink 1 | Magenta ink 1 | Magenta ink 2 | Magenta ink 3 |
|  | Third color ink | Yellow ink 1 | Yellow ink 1 | Yellow ink 1 | Yellow ink 2 | Yellow ink 3 |
|  | Fourth color ink | Black ink 1 | Black ink 1 | Black ink 1 | Black ink 2 | Black ink 3 |
| Water-based coating liquid |  | Coating liquid 4 | Coating liquid 5 | Coating liquid 6 | Coating liquid 2 | Coating liquid 1 |
| Fineness of printed image at high-speed printing |  | X | Δ(Expand) | X | X | X |
| Expansion and shrinkage at high-speed printing |  | X(Expand) | X(Expand) | X(Expand) | X(Shrink) | X(Shrink) |
| Adhesion properties | Drying temperature: 60° C. | Δ | Δ | Δ | Δ | Δ |
|  | Drying temperature: 100° C. | ○ | ○ | ○ | ○ | ○ |
| Scratch properties | Drying temperature: 60° C. | Δ | Δ | Δ | X | X |
|  | Drying temperature: 100° C. | ○ | ○ | ○ | ○ | Δ |

TABLE 11

|  |  | Example 21 | Example 22 | Example 23 | Example 24 | Example 25 | Example 26 | Example 27 |
|---|---|---|---|---|---|---|---|---|
| Water-based coloring ink | Ink set | Ink set 7 | Ink set 7 | Ink set 7 | Ink set 7 | Ink set 7 | Ink set 7 | Ink set 7 |
|  | First color ink | Cyan ink 7 | Cyan ink 7 | Cyan ink 7 | Cyan ink 7 | Cyan ink 7 | Cyan ink 7 | Cyan ink 7 |
|  | Second color ink | Magenta ink 7 | Magenta ink 7 | Magenta ink 7 | Magenta ink 7 | Magenta ink 7 | Magenta ink 7 | Magenta ink 7 |
|  | Third color ink | Yellow ink 7 | Yellow ink 7 | Yellow ink 7 | Yellow ink 7 | Yellow ink 7 | Yellow ink 7 | Yellow ink 7 |
|  | Fourth color ink | Black ink 7 | Black ink 7 | Black ink 7 | Black ink 7 | Black ink 7 | Black ink 7 | Black ink 7 |
| Water-based coating liquid |  | Coating liquid 1 | Coating liquid 2 | Coating liquid 3 | Coating liquid 7 | Coating liquid 8 | Coating liquid 9 | Coating liquid 10 |
| Fineness of printed image at high-speed printing |  | ○ | Δ(Shrink) | Δ(Expand) | ○+ | ○ | — | ○ |
| Expansion and shrinkage at high-speed printing |  | ○ | Δ(Shrink) | Δ(Expand) | ○ | ○ | ○ | ○ |
| Adhesion properties | Drying temperature: 60° C. | Δ | Δ | Δ | Δ | Δ | Δ | Δ |
|  | Drying temperature: 100° C. | ○ | ○ | ○ | ○ | ○ | ○ | ○ |
| Scratch properties | Drying temperature: 60° C. | Δ | Δ | Δ | ○ | Δ | Δ | Δ |
|  | Drying temperature: 100° C. | ○ | ○ | ○ | ○ | ○ | ○ | ○ |

TABLE 12

|  |  | Example 28 | Example 29 | Example 30 | Example 31 | Example 32 | Example 33 | Example 34 |
|---|---|---|---|---|---|---|---|---|
| Water-based coloring ink | Ink set | Ink set 7 | Ink set 7 | Ink set 7 | Ink set 7 | Ink set 7 | Ink set 8 | Ink set 7 |
|  | First color ink | Cyan ink 7 | Cyan ink 7 | Cyan ink 7 | Cyan ink 7 | Cyan ink 7 | Cyan ink 8 | Magenta ink 7 |
|  | Second color ink | Magenta ink 7 | Magenta ink 7 | Magenta ink 7 | Magenta ink 7 | Magenta ink 7 | Magenta ink 8 | Cyan ink 7 |
|  | Third color ink | Yellow ink 7 | Yellow ink 7 | Yellow ink 7 | Yellow ink 7 | Yellow ink 7 | Yellow ink 8 | Yellow ink 7 |
|  | Fourth color ink | Black ink 7 | Black ink 7 | Black ink 7 | Black ink 7 | Black ink 7 | Black ink 8 | Black ink 7 |
| Water-based coating liquid |  | Coating liquid 11 | Coating liquid 12 | Coating liquid 13 | Coating liquid 14 | Coating liquid 15 | Coating liquid 1 | Coating liquid 1 |
| Fineness of printed image at high-speed printing | | Δ(Expand) | ○ | ○ | Δ(Shrink) | ○ | Δ(Shrink) | Δ(Shrink) |
| Expansion and shrinkage at high-speed printing | | Δ(Expand) | ○ | ○ | Δ(Shrink) | Δ(Expand) | Δ(Shrink) | ○ |

TABLE 12-continued

|  |  | Example 28 | Example 29 | Example 30 | Example 31 | Example 32 | Example 33 | Example 34 |
|---|---|---|---|---|---|---|---|---|
| Adhesion properties | Drying temperature: 60° C. | Δ | Δ | Δ | Δ | Δ | Δ | Δ |
|  | Drying temperature: 100° C. | ○ | ○ | ○ | ○ | ○ | ○ | ○ |
| Scratch properties | Drying temperature: 60° C. | Δ | Δ | Δ | Δ | Δ | Δ | Δ |
|  | Drying temperature: 100° C. | ○ | ○ | ○ | ○ | ○ | ○ | ○ |

TABLE 13

|  |  | Example 35 | Example 36 | Example 37 | Example 38 | Example 39 | Example 40 |
|---|---|---|---|---|---|---|---|
| Water-based coloring ink | Ink set | Ink set 7 | Ink set 7 | Ink set 10 | Ink set 11 | Ink set 12 | Ink set 7 |
|  | First color ink | Yellow ink 7 | Black ink 7 | Cyan ink 10 | Cyan ink 11 | Cyan ink 12 | Cyan ink 7 |
|  | Second color ink | Magenta ink 7 | Magenta ink 7 | Magenta ink 10 | Magenta ink 11 | Magenta ink 12 | Magenta ink 7 |
|  | Third color ink | Cyan ink 7 | Yellow ink 7 | Yellow ink 10 | Yellow ink 11 | Yellow ink 12 | Yellow ink 7 |
|  | Fourth color ink | Black ink 7 | Cyan ink 7 | Black ink 10 | Black ink 11 | Black ink 12 | Black ink 7 |
| Water-based coating liquid |  | Coating liquid 1 | Coating liquid 1 | Coating liquid 1 | Coating liquid 1 | Coating liquid 1 | Coating liquid 16 |
| Fineness of printed image at high-speed printing |  | Δ(Shrink) | Δ(Shrink) | ○+ | ○ | ○ | Δ(Shrink) |
| Expansion and shrinkage at high-speed printing |  | ○ | ○ | ○ | ○ | ○ | Δ(Shrink) |
| Adhesion properties | Drying temperature: 60° C. | Δ | Δ | Δ | Δ | Δ | Δ |
|  | Drying temperature: 100° C. | ○ | ○ | ○ | Δ | Δ | ○ |
| Scratch properties | Drying temperature: 60° C. | Δ | Δ | Δ | ○ | Δ | Δ |
|  | Drying temperature: 100° C. | ○ | ○ | ○ | ○ | Δ | ○ |

TABLE 14

|  |  | Comparative example 6 | Comparative example 7 | Comparative example 8 | Comparative example 9 | Comparative example 10 |
|---|---|---|---|---|---|---|
| Water based coloring ink | Ink set | Ink set 7 | Ink set 7 | Ink set 7 | Ink set 8 | Ink set 9 |
|  | First color ink | Cyan ink 7 | Cyan ink 7 | Cyan ink 7 | Cyan ink 8 | Cyan ink 9 |
|  | Second color ink | Magenta ink 7 | Magenta ink 7 | Magenta ink 7 | Magenta ink 8 | Magenta ink 9 |
|  | Third color ink | Yellow ink 7 | Yellow ink 7 | Yellow ink 7 | Yellow ink 8 | Yellow ink 9 |
|  | Fourth color ink | Black ink 7 | Black ink 7 | Black ink 7 | Black ink 8 | Black ink 9 |
| Water-based coating liquid |  | Coating liquid 4 | Coating liquid 5 | Coating liquid 6 | Coating liquid 2 | Coating liquid 1 |
| Fineness of printed image at high-speed printing |  | X | Δ(Expand) | X | X | X |
| Expansion and shrinkage at high-speed printing |  | X(Expand) | X(Expand) | X(Expand) | X(Shrink) | X(Shrink) |
| Adhesion properties | Drying temperature: 60° C. | Δ | Δ | Δ | Δ | Δ |
|  | Drying temperature: 100° C. | ○ | ○ | ○ | ○ | ○ |

TABLE 14-continued

| | | Comparative example 6 | Comparative example 7 | Comparative example 8 | Comparative example 9 | Comparative example 10 |
|---|---|---|---|---|---|---|
| Scratch properties | Drying temperature: 60° C. | Δ | Δ | Δ | X | X |
| | Drying temperature: 100° C. | ○ | ○ | ○ | Δ | Δ |

The invention claimed is:

1. An ink set, comprising: a water-based coloring ink and a water-based coating liquid having an acting of aggregating the water-based coloring ink, wherein
the water-based coloring ink comprises water in a range of 50% by mass to 90% by mass, a pigment in a range of 0.5% by mass to 10% by mass, a water-soluble solvent in a range of 5% by mass to 49% by mass, and a resin in a range of 1% by mass to 10% by mass, the water-based coloring ink may further comprise a surface conditioner, and the resin in the water-based coloring ink comprises a self-dispersible urethane resin,
the water-based coating liquid comprises water in a range of 50% by mass to 90% by mass, a water-soluble solvent in a range of 5% by mass to 49% by mass, and a resin in a range of 0.005% by mass to 15% by mass, wherein
the water-based coating liquid comprises an amine compound selected from the group consisting of N-methyldiethanolamine, N-ethyldiethanolamine, N,N-dimethylethanolamine, and N,N-diethylethanolamine,
the water-based coating liquid optionally comprises a surface conditioner,
the water-soluble solvent in the water-based coating liquid comprises a diol compound and/or a glycol ether compound, and
the resin in the water-based coating liquid comprises a water-soluble polymer having a cation,
a dynamic surface tension value at 25° C. at a surface life of 100 ms of the water-based coating liquid is smaller than a dynamic surface tension value at 25° C. at a surface life of 100 ms of the water-based coloring ink,
a difference between the dynamic surface tension value at 25° C. at a surface life of 100 ms of the water-based coating liquid and the dynamic surface tension value at 25° C. at a surface life of 100 ms of the water-based coloring ink is 7 mN/m or more and 20 mN/m or less, and
the dynamic surface tension value at 25° C. at a surface life of 100 ms of the water-based coating liquid is within a range of 20 to 30 mN/m.

2. The ink set according to claim 1, wherein the water-based coating liquid comprises the water in a range of 50% by mass to 90% by mass, the water-soluble solvent in a range of 5% by mass to 35% by mass, and the resin in a range of 0.005% by mass to 5% by mass.

3. The ink set according to claim 1, wherein the water-based coloring ink comprises polyether urethane resin particles and/or polyester urethane resin particles.

4. The ink set according to claim 1, wherein the water-based coating liquid comprises a polyether-modified silicone-based surface conditioner.

5. The ink set according to claim 1, wherein the water-based coloring ink comprises a polyether-modified silicone-based surface conditioner.

6. The ink set according to claim 1, wherein
a static surface tension at 25° C. of the water-based coating liquid is within a range of 20 to 25 mN/m, and a static surface tension at 25° C. of the water-based coloring ink is within a range of 20 to 50 mN/m, and
the static surface tension at 25° C. of the water-based coating liquid is smaller than the static surface tension at 25° C. of the water-based coloring ink, and a difference therebetween is 3 mN/m or more and 15 mN/m or less.

7. The ink set according to claim 1, wherein
an acid value (A) of the self-dispersible urethane resin is within a range of 5 to 60, and
a ratio (A:B) of the acid value (A) of the self-dispersible urethane resin to a cation degree (B) of the water-soluble polymer is within a range of 10:1 to 1:1.

8. The ink set according to claim 1, wherein the water-based coating liquid comprises a water-soluble polymer having a quaternary ammonium cation, and a proportion of the water-soluble polymer having a quaternary ammonium cation in the resin included in the water-based coating liquid is within a range of 50% by mass or more.

9. The ink set according to claim 1, wherein a pH of the water-based coating liquid is within a range of 7.01 to 10.0.

10. The ink set according to claim 1, wherein
the water-based coating liquid and the water-based coloring ink comprise the amine compound,
a content of the amine compound in the water-based coating liquid is 0.1 to 2.0% by mass, and
a content of the amine compound in the water-based coloring ink is 0.1 to 2.0% by mass.

11. A printing method in which a print layer is formed on a substrate by an inkjet printer provided with the ink set according to claim 1, comprising:
ejecting the water-based coating liquid from a print head to land coating droplets on the substrate; and
ejecting the water-based coloring ink from the print head to land ink droplets on the coating liquid to form the print layer.

12. The printing method according to claim 11, further comprising: drying the print layer with hot air.

13. The printing method according to claim 11, further comprising: drying the print layer with hot air at 70 to 130° C.

14. The printing method according to claim 11, wherein the substrate is a non-absorbent substrate or a poorly absorbable substrate.

15. The printing method according to claim 11, wherein the water-based coloring ink is composed of a plurality of water-based coloring inks, and the water-based coloring ink that first lands on the coating liquid has a lowest dynamic surface tension at 25° C. at a surface life of 100 ms among the plurality of water-based coloring inks.

* * * * *